US006606542B2

(12) United States Patent
Hauwiller et al.

(10) Patent No.: US 6,606,542 B2
(45) Date of Patent: *Aug. 12, 2003

(54) SYSTEM AND METHOD FOR CREATING AGRICULTURAL DECISION AND APPLICATION MAPS FOR AUTOMATED AGRICULTURAL MACHINES

(75) Inventors: Joseph I. Hauwiller, Eden Prairie, MN (US); Youxuan Jin, Bellevue, WA (US)

(73) Assignee: Agco Corporation, Duluth, GA (US)

(*) Notice: Subject to any disclaimer, the term of this patent is extended or adjusted under 35 U.S.C. 154(b) by 134 days.

This patent is subject to a terminal disclaimer.

(21) Appl. No.: 09/815,225

(22) Filed: Mar. 22, 2001

(65) Prior Publication Data

US 2001/0016788 A1 Aug. 23, 2001

(Under 37 CFR 1.47)

Related U.S. Application Data

(63) Continuation of application No. 08/774,627, filed on Dec. 30, 1996, now Pat. No. 6,236,907, which is a continuation-in-part of application No. 08/452,894, filed on May 30, 1995, now abandoned.

(51) Int. Cl.[7] .............................................. G05D 11/00
(52) U.S. Cl. ...................... 700/283; 701/50; 111/200; 702/5
(58) Field of Search ............................. 701/50; 702/5; 700/9, 240, 241, 244, 283, 284; 111/200

(56) References Cited

U.S. PATENT DOCUMENTS

| | | |
|---|---|---|
| 1,005,822 A | 10/1911 | Ford |
| 1,526,642 A | 2/1925 | Nissley |
| 2,596,390 A | 5/1952 | Esseck |
| 2,684,865 A | 7/1954 | Lattner |
| 2,699,967 A | 1/1955 | Edinborough et al. |
| 2,757,044 A | 7/1956 | Gerbracht |
| 2,759,762 A | 8/1956 | Kostka et al. |
| 2,772,921 A | 12/1956 | Nance |
| 2,857,863 A | 10/1958 | Jessen |
| 3,044,661 A | 7/1962 | Cartwright |
| 3,143,295 A | 8/1964 | Booker |
| 3,233,832 A | 2/1966 | Hallberg |
| 3,270,962 A | 9/1966 | Watts |
| 3,301,487 A | 1/1967 | Young |
| 3,330,070 A | 7/1967 | Ferm |
| 3,344,993 A | 10/1967 | Wilder |
| 3,366,281 A | 1/1968 | Wilder |
| 3,419,221 A | 12/1968 | Fryk |
| 3,463,397 A | 8/1969 | Mecklin |
| 3,511,411 A | 5/1970 | Weiss |
| 3,550,866 A | 12/1970 | Swenson |
| 3,584,788 A | 6/1971 | Lloyd |
| 3,585,827 A | 6/1971 | Dominguez |

(List continued on next page.)

Primary Examiner—John Follansbee
Assistant Examiner—Edward F. Gain, Jr.
(74) Attorney, Agent, or Firm—Troutman Sanders LLP; Gerald R. Boss

(57) ABSTRACT

A system for creating application maps for controlling a dispensing apparatus based upon field data, the system including a system for maintaining field data. The field data may be georeferenced relative to geographic coordinates of the location of the field data. Application rate equations for correlating field data relative to desired output may be selectively defined based upon selected field data and desired output to produce application maps for a particular field. A processor is designed to selectively access field data for a particular field to execute application rate equations for the field data to produce an application map which may be used for variable rate application of material by dispensing apparatus based upon the selected field data and the desired output.

18 Claims, 17 Drawing Sheets

U.S. PATENT DOCUMENTS

| | | |
|---|---|---|
| 3,589,614 A | 6/1971 | Linville |
| 3,679,098 A | 7/1972 | Weiss |
| 3,770,198 A | 11/1973 | Mihara |
| 3,782,634 A | 1/1974 | Herman |
| 3,792,709 A | 2/1974 | Johnson |
| 3,815,830 A | 6/1974 | Rowan |
| 3,855,953 A | 12/1974 | Fathauer |
| 3,877,645 A | 4/1975 | Oligschlaeger |
| 3,945,332 A | 3/1976 | Wirsbinski |
| 3,976,231 A | 8/1976 | Betulius |
| 3,978,324 A | 8/1976 | Rayner |
| 4,014,271 A | 3/1977 | Rohlf |
| 4,015,366 A | 4/1977 | Hall |
| 4,023,020 A | 5/1977 | Lestradet |
| 4,052,003 A | 10/1977 | Steffen |
| 4,093,107 A | 6/1978 | Allman |
| 4,116,138 A | 9/1978 | McFarland |
| 4,176,395 A | 11/1979 | Evelyn-Veere |
| 4,197,995 A | 4/1980 | Campbell |
| 4,209,131 A | 6/1980 | Barash |
| 4,212,428 A | 7/1980 | Walker |
| 4,220,998 A | 9/1980 | Kays |
| 4,229,799 A | 10/1980 | Herwig |
| 4,252,274 A | 2/1981 | Kubacak |
| 4,277,022 A | 7/1981 | Holdsworth |
| 4,350,293 A | 9/1982 | Lestradet |
| 4,351,535 A | 9/1982 | Mead |
| 4,357,670 A | 11/1982 | McFarlane |
| 4,358,054 A | 11/1982 | Ehrat |
| 4,392,611 A | 7/1983 | Bachman |
| 4,456,176 A | 6/1984 | Agius |
| 4,462,079 A | 7/1984 | Ito |
| 4,465,211 A | 8/1984 | van der Lely |
| 4,467,961 A | 8/1984 | Coffee |
| 4,518,118 A | 5/1985 | Takata |
| 4,523,280 A | 6/1985 | Bachman |
| 4,530,463 A | 7/1985 | Hiniker |
| 4,545,396 A | 10/1985 | Miller |
| 4,553,702 A | 11/1985 | Coffee |
| 4,588,127 A | 5/1986 | Ehrat |
| 4,629,164 A | 12/1986 | Sommerville |
| 4,630,773 A | 12/1986 | Ortlip |
| 4,637,547 A | 1/1987 | Hiniker |
| 4,669,662 A | 6/1987 | Bruce |
| 4,677,787 A | 7/1987 | Said |
| 4,714,196 A | 12/1987 | McEachern |
| 4,721,245 A | 1/1988 | van Zweeden |
| 4,723,710 A | 2/1988 | Lucore |
| 4,725,004 A | 2/1988 | Baran |
| 4,755,942 A | 7/1988 | Gardener |
| 4,798,325 A | 1/1989 | Block |
| 4,803,626 A | 2/1989 | Bachman |
| 4,805,088 A | 2/1989 | Cross |
| 4,805,089 A | 2/1989 | Lane et al. |
| 4,813,604 A | 3/1989 | Curran |
| 4,817,870 A | 4/1989 | Dalton |
| 4,823,268 A | 4/1989 | Giles |
| 4,826,083 A | 5/1989 | Vanderjagt |
| 4,865,253 A | 9/1989 | Gill |
| 4,878,614 A | 11/1989 | Hach |
| 4,886,208 A | 12/1989 | Strand |
| 4,895,303 A | 1/1990 | Freyvogel |
| 4,925,096 A | 5/1990 | Gill |
| 4,930,702 A | 6/1990 | Vanderjagt |
| 4,932,232 A | 6/1990 | Ballyns |
| 4,967,957 A | 11/1990 | Bachman |
| 4,986,782 A | 1/1991 | Severtson |
| 4,992,942 A | 2/1991 | Bauerle |
| 5,014,914 A | 5/1991 | Wallenas |
| 5,016,817 A | 5/1991 | Ghate |
| 5,021,939 A | 6/1991 | Pulgiese |
| 5,033,397 A | 7/1991 | Colburn |
| 5,050,771 A | 9/1991 | Hanson |
| 5,077,653 A | 12/1991 | Barlet |
| 5,130,925 A | 7/1992 | Janes |
| 5,170,820 A | 12/1992 | Jones |
| 5,173,079 A | 12/1992 | Gerrish |
| 5,184,420 A | 2/1993 | Papadopoulos |
| 5,193,469 A | 3/1993 | Tochor |
| 5,214,757 A | 5/1993 | Mauney et al. |
| 5,220,876 A | 6/1993 | Monson |
| 5,246,164 A | 9/1993 | McCann |
| 5,260,875 A | 11/1993 | Tofte |
| 5,299,737 A | 4/1994 | McGinnis |
| 5,310,113 A | 5/1994 | Cowgur |
| 5,314,120 A | 5/1994 | Nau |
| 5,323,721 A | 6/1994 | Tofte |
| 5,327,708 A | 7/1994 | Gerrish |
| 5,355,815 A | 10/1994 | Monson |
| 5,453,924 A | 9/1995 | Monson |
| 5,461,229 A | 10/1995 | Sauter |
| RE35,100 E | 11/1995 | Monson et al. |
| 5,467,251 A | 11/1995 | Katchmar |
| 5,689,418 A | 11/1997 | Monson |
| 6,236,907 B1 * | 5/2001 | Hauwiller et al. .......... 111/200 |

* cited by examiner

SYSTEM AND METHOD FOR CREATING AGRICULTURAL DECISION AND APPLICATION MAPS FOR AUTOMATED AGRICULTURAL MACHINES

CROSS-REFERENCE TO RELATED APPLICATION(S)

The present application is a continuation of U.S. patent application entitled System and Method for Creating Agricultural Decision and Application Maps for Automated Agricultural Machines, Ser. No. 08/774,627, filed Dec. 30, 1996, U.S. Pat. No. 6,236,907 which is a continuation-in-part of application Ser. No. 08/452,894 filed May 30, 1995, now abandoned entitled System and Method for Creating Agricultural Decision and Application Maps for Automated Agricultural Machines now abandoned.

BACKGROUND OF THE INVENTION

This invention relates generally to a system and method for creating variable rate application maps for applying dispensing materials to a field. In particular, the present invention relates to a system for creating variable rate application maps which allow the user to vary the dispensing rate of dispensing materials at various field locations depending upon different field conditions at different field locations. In particular, the present invention relates to a geographic information system for maintaining geographic field data and other data for site specific farming applications.

Typically, dispensing apparatus for dispensing materials (such as fertilizer, seeds, etc.) to a field have applied such materials uniformly across a field irrespective of varying field conditions across the field. Such application of materials at a constant rate without consideration to varying field conditions may not provide optimal efficiency or yield. Accordingly, it is desirable to vary the dispensing rates of materials depending upon varied field conditions. Various field conditions, such as soil characteristics and nutrient levels, affect plant growth. Accordingly, it is desirable to provide varying application rates of dispensing materials to accommodate for varied field conditions.

Systems are already known which are capable of evaluating soil nutrient levels and other field conditions. Thus, it is desirable to use such field characteristics to determine optimum or desired dispensing levels at varied locations. The criteria for determining desired dispensing rates and data available may vary. Thus, it is desirable to have a dynamic system for generating variable rate application maps for use with a controller with the flexibility to evaluate dispensing rates depending upon selected data and varied criteria. Additionally, it is desirable to have a system for creating application maps which may consider varied available data for the purpose of achieving optimum dispensing rates for various materials.

BRIEF SUMMARY OF THE INVENTION

The present invention relates to a dynamic system for creating application maps for use with a controller for a dispensing apparatus for dispensing materials to a field. The application maps determine variable rates for application of dispensing materials depending upon varied field conditions. Thus, dispensing materials are dispensed at variable rates across the field depending upon the particular field conditions at a particular field location. Preferably, the system includes a geographic information system for storing field data relative to data type and a georeferenced field location. Preferably, spatial field data is georeferenced relative to longitudinal and latitude coordinates for storage, access and manipulation of said data for creating georeferenced application maps in one embodiment of the invention. The system also includes a means for storing field boundary data for correlating spatial data relative to a specific field.

Preferably, the system includes user interface means for selectively defining various application rate equations for determining rates of application for a particular dispensing material based upon particular field data desired for various field locations. The application rate equations are selectively defined by a user relative to desired relationships between selected data and desired output. A processor is operably associated with the stored field data and the user interface means for defining various application rate equations for use in determining varied application rates for a particular field for a particular dispensing material. The application rate equation correlate selected data and desired output to produce a variable rate application map for a field.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION

The present invention relates to a system for evaluating characteristics, (such as topography, and soil data, etc.), for a particular field for precision farming and site specific farming applications. In particular, the present invention relates to a system for creating application maps for variable rate application of various dispensing materials based upon varied field characteristics or conditions. The application maps comprise dispensing rate data for varying amounts of a dispensing material based upon both geographic and attribute data. The preferred embodiment of the present invention described as follows, is used for controlling and monitoring automated agricultural machines for variable rate application including, but not limited to equipment utilizing the FALCON™ controller manufactured by Soil Teq, Inc. of Minnetonka, Minn.

Figure 1:
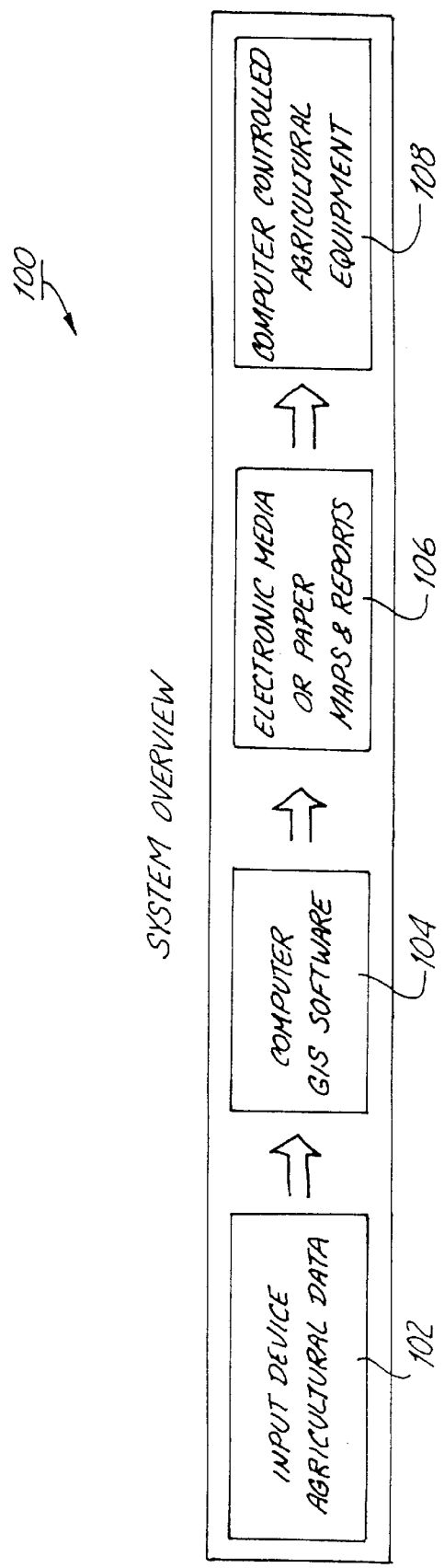
FIG. 1 is a block diagram of one preferred embodiment for the present inventive geographical information system for creating agricultural decision and application maps for automated agricultural machines.

FIG. 1 illustrates the simplest embodiment 100 of the present invention capable of creating maps or reports for real time monitoring and control of automated agricultural machines or dispensing apparatus 108. As shown, the system for creating and using application maps 100 generally includes an input device 102 for inputting field data (such as attribute or geographical data 202 and 204, and a geographic information system ("GIS") 104. The GIS 104 comprises computer hardware and software that is used to produce application maps or reports 106 which may be used for controlling a dispensing apparatus for agricultural equipment 108. The system for creating application maps 100 uses information from various sources about an agricultural field to determine what agricultural treatments are necessary throughout the field. Preferably, these treatments are either in report or map form on hard copy (paper), a display, or electronic or magnetic media 106. As stated hereinbefore, the reports or maps are then used in an automated agricultural machine or dispensing apparatus 108 such as the FALCON™ controller by Soil Teq, Inc., to control the agricultural treatments applied to a field.

The system 104 contains GIS software, which provides a system for handling spatial data for use in creating application maps 106, thereby enabling the system to input data, manipulate the input data, and perform mathematical and spatial calculations along and through different types of data based on an embedded expert system's or user's recommendations for producing application treatment maps as will be described in further detail herein.

Figure 2:
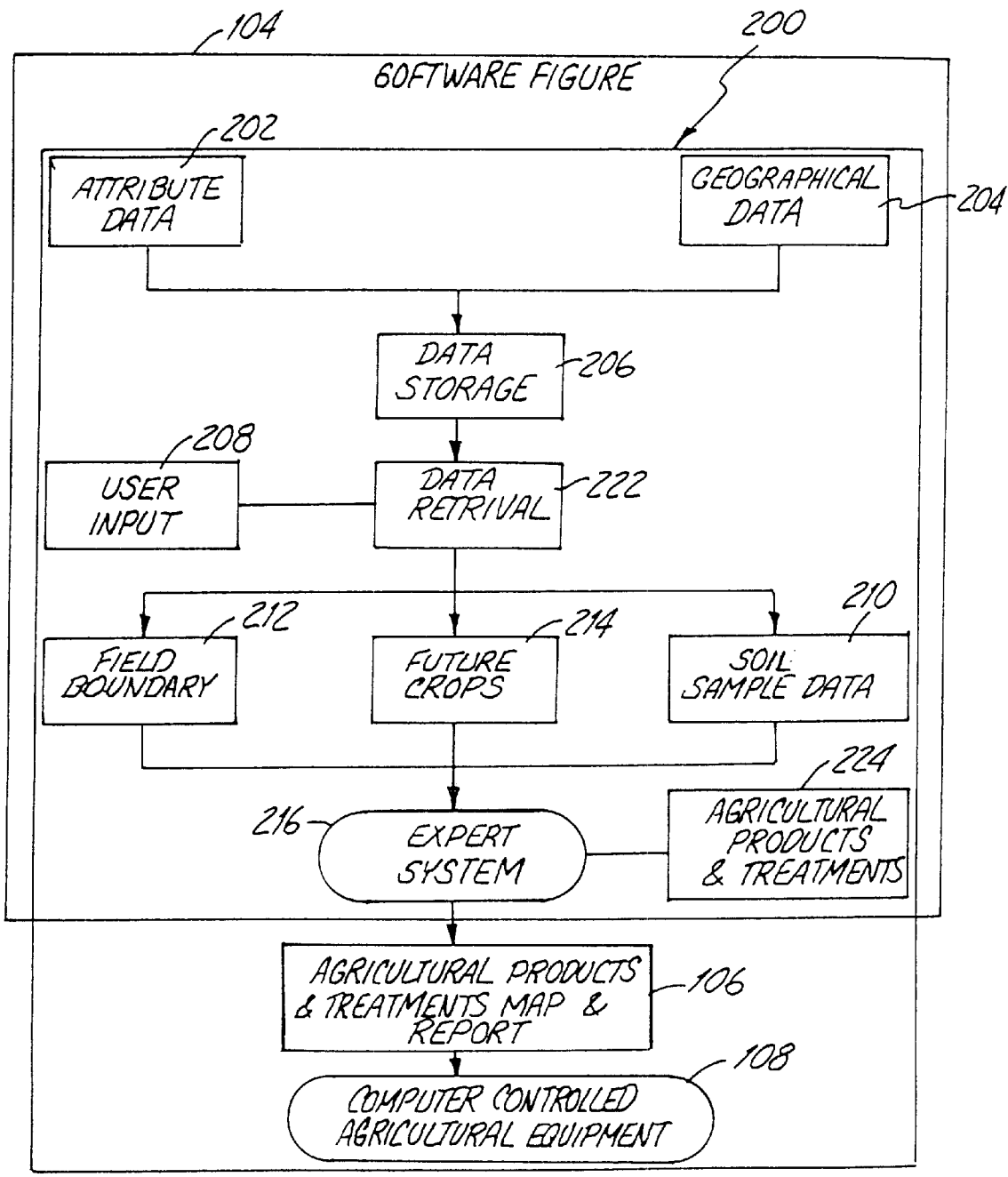
FIG. 2 is a flow chart depicting one preferred embodiment for the present inventive geographical information system software for creating application maps for controlling automated agricultural machines.

FIG. 2 illustrates a flow chart depicting one preferred embodiment for the present inventive GIS software of a system 200 for creating application maps 106 for controlling agricultural equipment 108. It is preferable that system 200 utilize a combination of attribute data 202 and geographical data 204 in combination with specific user data 208 (i.e. application rate equations). The user inputs instructions to the system for creating a particular map via user input 208. The geographical data 204 preferably includes field boundary data 212 and soil sample data 210. Soil sample data 210 may include soil test data in either systematic or random form of soil nutrient levels, soil pH, soil texture and characteristics, organic matter, etc. Attribute data 202 may include future crops data 214, cost data, dealer information, farmer information, and account information, and also agricultural products and treatment data 224.

The GIS system 104 provides data storage 206 for spatial field data (such as geographical data 204) and other field or characteristics data (such as attribute data 202.) The data storage 206 function of the GIS system 104 stores geographic data (which may also be called spatial field data) 204 based upon geographic location as will be described in further detail herein. Attribute and geographic data 202 and 204 such as field boundary data 212, future crops 214, and soil sample data 210 may be retrieved as illustrated at 222 for producing agricultural products and treatment maps and reports (application maps) 106 based upon user inputted instructions and data 208. The system for generating maps 104 may include agricultural product information data 224 which may be used as shown in FIG. 2 for creating application maps or reports for a particular agricultural product which may be dispensed. Various agricultural products comprise blends of nutrients or other field treatment materials. Agricultural product information data 224 includes information, such as the composition of various commercial agricultural products.

The system for creating application maps 200 includes a processor or expert system 216 which is used to generate the application maps 106 based upon field data or other data and desired relationship between the specific field data and desired output. The processor or expert system 216 creates application maps illustrated by block 106 of FIG. 2 based upon one or more relationships between one or more factors relating to crop production. These relationships are preferably mathematical, spatial, and may be user defined and/or other relationships which would be beneficial to those skilled in the art to establish such relationships relating to crop production emanating from attribute data and geographical data.

The system for creating application maps 104 preferably formulates agricultural products and treatments reports and maps, as illustrated in block 106 in FIG. 2. As stated hereinbefore, the maps and reports 106 can preferably be generated either in electronic or paper form for providing the necessary input data required to control the computer controlled agricultural equipment 108, e.g. applicator or a manual applicator such that at least one agricultural product is dispersed from equipment 108 in conformance with the maps and/or reports 106. The relationships between the factors relating to crop production establish boundary conditions or limits which optimize and restrict the map formulation process such that product application errors may often be eliminated, e.g. accidental misuse of a restricted chemical for example. However, the present invention is not so limited, and those skilled in the art will readily appreciate the multitude of additional advantages provided by using such a system to control generation of application maps for controlling automated agricultural equipment 108.

The input device 102 of the system of creating application maps 100 embodied in FIG. 1 may be a mouse, digitizing tablet, or keyboard, for inputting data, such as, attribute data 202, geographical data 204, user defined data 208 and agricultural products and treatments data 224 into GIS computer 104. This data is then stored in the GIS computer 104 in a temporary storage device such as a random access memory (RAM) while it is waiting for access by a CPU, e.g. Intel 80×86 series of microprocessors as will be explained. It will be appreciated by those skilled in the art that other CPU devices and memory types, both volatile and non-volatile may just as well be utilized for the present application. Subsequent to accessing the aforementioned data, the CPU stores the data on a media used for a long term data storage, e.g. hard disk drive, floppy disk, etc. in a manner well known to those skilled in the art.

Preferably, the data is stored in layers based on data type and geographical location and may include commercially available database files and tables or a record manager specifically for a predetermined application, for example. The data storage is depicted in block 206 in FIG. 2. Georeferenced location or global coordinates may be based upon latitude and longitude coordinates as well as other coordinate systems such as radians or UTM coordinates. Geographic based data may be incorporated into the present GIS system in a variety of formats not limited to a coordinate based system and may include boundary based data which is processed for input into the field spatial database for use in creating application maps as will be described. As stated hereinbefore, each data layer can be manipulated mathematically or spatially within itself or another data layer as the data flows through the GIS system 104 in conformance with the data flow depicted in FIG. 2. Most preferably, the data is compressed to reduce GIS computer 104 storage requirements and to allow fast access to data stored in the database as depicted by block 222. Georeferenced mapped information may be recalled by state, county, township section and field.

Figure 3:
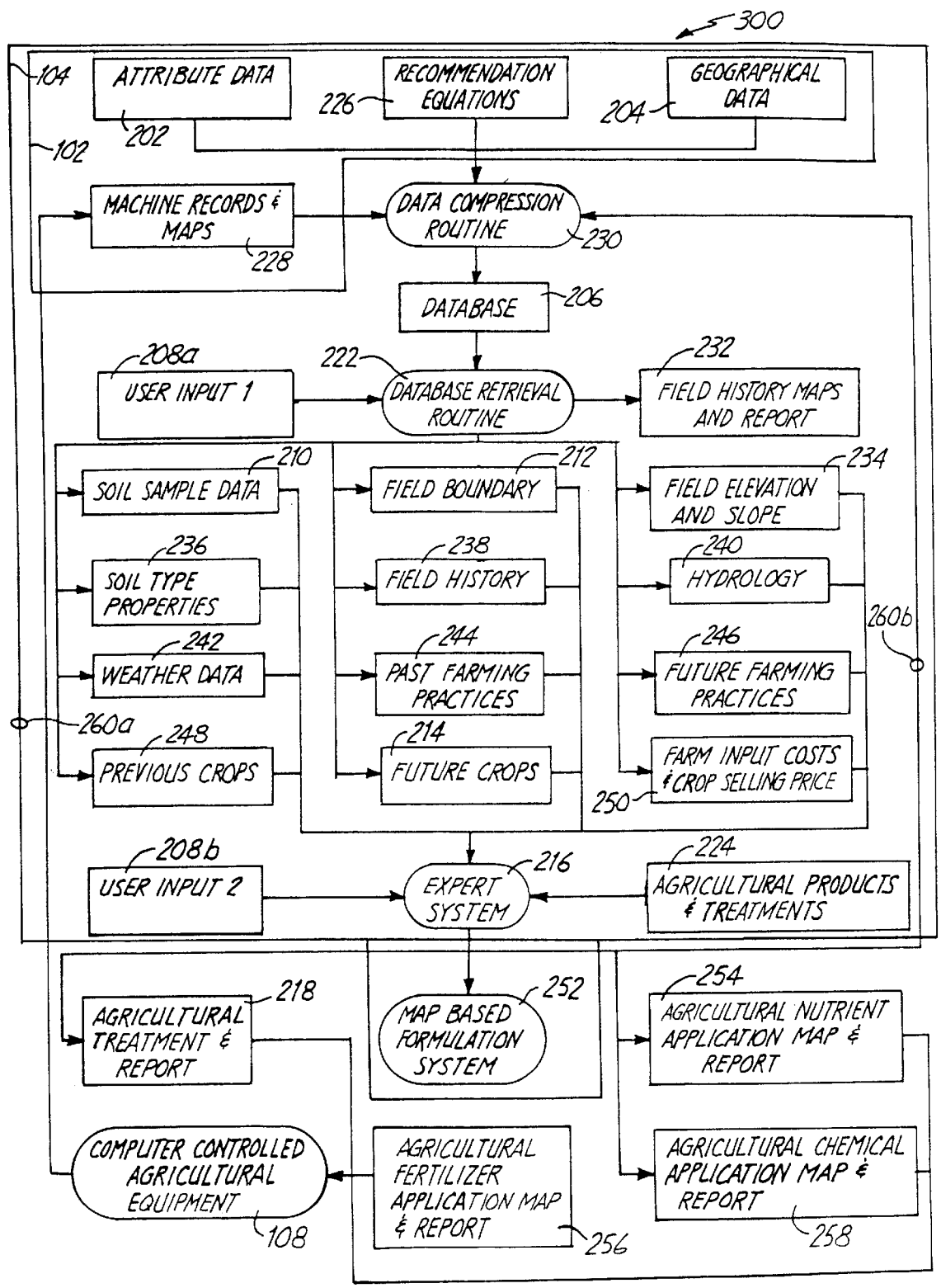
FIG. 3 is a more detailed flow chart illustrating a preferred embodiment for the present inventive geographical information system software.

Preferably, the GIS system 104, at a minimum, utilizes attribute data 202 and geographical data 204 to formulate maps and reports including agricultural products and treatments maps and reports 106. Additional user defined input data 208 may also be combined with attribute data 202 and geographical data 204 to generate and further refine the detail of the desired maps and reports. FIG. 3 is more detailed embodiment of the system for creating and using application maps 300 incorporating a geographical information system in accordance with the present invention. As stated hereinbefore, GIS technology has several advantages for the agricultural industry. Particularly, the present inventive application of GIS technology deals with field management and precision farming.

For purposes of clarity and understanding regarding operation of the present inventive GIS, a list of definitions applicable to the embodiments of the present invention depicted in FIGS. 2 and 3 are as follows:

Attribute Data—data type that is not specifically tied to a geocoordinate; examples including input costs, dealer and farmer information, such as name, address, account identification, etc.

Geographical Data—data type including all types of information that is associated with geographical locations; examples including field boundaries; waterways, well heads, soil type data, yield monitor data, etc.

User Input I—The user will specify which field she is interested in and what report and map she wishes to generate; possible maps including economic, past practices, land ownership, planned farm operation, etc.

Soil Sample Data—may consist of laboratory tested soil samples taken from a field of interest in either a systematic or random pattern. The laboratory tests these samples for the current condition of the soil in a field as it relates to crop growth. These tests may include soil nutrient levels, soil pH, soil texture, organic matter and others that are important for a given crop. This data is used to build a soil profile through various mathematical modeling techniques for use by an expert system.

Field Boundary Data—consists of data that describes a field outline; may be obtained by tracing or scanning a photograph or drawing of a field or using a vehicle equipped with sensors that surmise the field boundary while operating in the field.

Future Crop Data—consists of types of crops that may be planted in a field; used by an expert system to perform its calculations.

Expert System—a system defined by the use of one or more relationships between one or more factors that relate to crop production. The relationships may be mathematical, spatial, user defined or other; including recommendation equations for a given nutrient and crop as published by most state universities.

Agriculture Products and Treatments Data—data type including all types of agricultural products chemical compositions and their legally prescribed use; data used by an expert system to prevent the accidental misuse of a restricted chemical. This data is also used by the Map Based Formulation System.

Agricultural Products and Treatments Maps and Reports—The maps and reports can either be in electronic or paper form. The maps contain information that define where in a field a certain rate and location within a field a farm input or action will be applied. The map could be used either by a computer controlled applicator or a manual applicator.

Computer Controlled Agricultural Equipment—This machinery may include equipment such as Soil Teq, Inc.'s FALCON™ control system.

Map Based Formulation System—The formulation routing formulates, zone by zone, commercial or custom fertilizer to match the nutrient recommendation from the expert system based on input costs, product availability and suitability for the crop and applicator.

Agricultural Nutrient Application Map and Report—This map and report can either be in electronic or paper form. The map contain geocoordinates that define where in a field a certain nutrient requirement exists for a given crop(s). The primary use for this data is for historic purposes; however, other uses may be possible.

Machine Records and Maps—This data is either recorded by the applicator equipment itself or entered by the operator as to what actually happened during the field application. This information is used as historic data.

Previous Crops—Previous crops includes data as the type of crop, the seed variety, planting population and the yield received from the field. This data is important for tuning the expert system as part of the historical information. Previous crop is also used to determine which soil properties were affected by the crop and how they were affected. This information is also used by the expert system for determining which crop and field treatments to perform on the field in the future.

Field History—Field history contains both map and textual data. The map data may include information about field ownership and others. The textual data may include attribute data for the map data and other information that was gathered about the field before GIS technology was used to store this data.

Past Farming Practices—This information would include data about manure management, land leveling, deforestation, tillage and others. This data would be used in the expert system as part of the field history data.

Field Elevation and Slope—This information is used by the expert system for determining water run-off and leaching potential for applying farm chemicals and products. It is also used in determining plant population. This data will be used by the expert system.

Hydrology—This data is used for several purposes, e.g. water table studies, proximity of a field application to a well or waterway and irrigation. This data is used by the expert system.

Future Farming Practices—This data would be the planned tillage, irrigation and others and how they would affect crop production. This information is used by the expert system.

Farm Input Costs and Crop Selling Price—This data contains all of the costs associated with crop production and its expected selling price. This data could be used for determining gross margin maps and reports as well as determining the best economic treatment for a field. This data is used by the expert system.

User Input 2—This interface allows the user to see what the expert system is recommending for a field and override the system before the maps are created for the applicator.

Recommendation Equations—the mathematical formulas that express the relationships between existing field conditions and the desired crop yield. These formulas can either be derived from empirical data sources or determined by an expert in the field of agriculture.

Data Compression and Retrieval Routines—Data compression is necessary to reduce computer system data storage requirements and to allow fast access to data stored in the database. One possible adaptation of this is using quadtree data storage.

Database—The term database is used for the actual computer file(s) and table(s) that store the information in the GIS.

Field History Maps and Reports—represents the data and reports that are necessary for professionals in the agricultural industry to study past practices and learn how different conditions affected past crops. This data is used for tuning and redefining the expert system.

Soil Type Properties—include a measure of how well a given area of a field can sustain a given crop. This information may include a soil's ability to hold water, its susceptibility to erosion, its susceptibility to leaching farm products such as fertilizer and chemicals, as well as others. This data is used to build a soil profile through various mathematical modeling techniques for the expert system.

Weather Data—This data may consist of historical and real time data. The historical data is used for making predictions for anticipated weather conditions as it relates to farm planning. It is also used for historical data analysis on fields to help determine what effects weather had on previous crops. This information would be used in the expert system. Real time weather is used by the farm chemical applicator to determine wind speed and direction, precipitation and others for deciding when to apply certain chemicals or inputs to a field.

Additional aspects or the present invention can be better understood with reference to the flow chart depicted in FIG. 3. FIG. 3 shows attribute data 202, recommendation equations 226, and geographic data 204. A data compression routine 230 is used to compress the attribute data 202, recommendation equations 226, and geographical data 204 for storage in database 206. A data base retrieval routine 222 can be used to retrieve the data in the form of soil sample data 210, field boundary data 212, field elevation and slope data 234, soil type properties data 236, field history data 238, hydrology data 240, weather data 242, past farming practices 244, future farming practices 246, previous crops data 218, future crops data 214, and farm input costs and crop selling price 250.

FIG. 3 illustrates a preferred method of applying GIS technology in precision agriculture and provides a tool for all aspects of converting agronomic data into georeferenced mapped information for producing georeferenced application maps for varied rate application of dispensing material at various field locations. Maps are the visual basis for locating specific spots, defining soil needs and initiating automatic application control. Such application of GIS technology to formulate and generate maps used to control automated agricultural equipment has been heretobefore unknown in the agricultural industry or to those skilled in the art of agronomics.

Looking now at FIG. 3, the process begins by inputting attribute data 202 and geographical data 204 into the present inventive GIS system for use in determining optimum treatment systems. Attribute data 202 may include input costs, dealer and farmer information such as name, address, account identification, etc. Geographical or field data 204 may include field boundaries, waterways, well heads, soil data, yield monitor data, etc. It is preferable that the input data also include recommendation equations as illustrated in block 226. Field data may be spatial data such as soil property data 236, soil sample data 210, field elevation and slope data 234, hydrology data 240, field history data 238 (including yield data). Other map type data and non-spatial field data may include weather data 242, previous and future crop information 248, 214, and farm input costs and crop selling price 250.

Recommendation equations 226 are the mathematical formulas that express the relationship between existing field conditions and the desired crop yield (i.e., relate field data to desired output) for determining the amount of dispensing material, and may be derived from the empirical data sources or determined by an expert in the field of agricultural, as defined hereinbefore. Additionally, these recommendations equations 226 preferably are tailored to match the characteristics of the automated agricultural equipment 108, e.g. implemented in a manner such that the specific equipment of interest is capable of accurately responding to and meeting the characteristics specified by the recommendation equation(s) 226.

Because the quantity, complexity and diversity of agronomic data used in the present inventive application must be stored in a database for later retrieval as necessary dependent upon the desired end results and type of machine control desired, the present invention is equipped with spatial database software as an information center as will be explained more fully herein. The inventive system can store all of the information required to manage a field (i.e. field data), including geographical data 204 and attribute data 202 as referenced hereinbefore. Certain spatial data may be stored in a field spatial database (FSBD) 206. The data is compressed as illustrated by block 230 for storage 206, and retrieval 222 as will be described herein. The data which may be stored in the field spatial database (FSBD) 206 includes spatial field data maps such as geographical data 204, as well as maps (for example 218, 232, 254, 256 and 258) generated by the GIS system 104 for various dispensing applications or a map recorded by a controller for agricultural equipment which includes a historical description of the application of dispensing materials to a field 228 as illustrated on the flow chart of FIG. 3 by feedback lines 260a and 260b respectively. This map information may be stored for later use and analysis for field treatment. Maps 218, 254, 232, 256 and 258 illustrate the various georeferenced mapped information which may be produced for the aid of precision farming.

Looking again at FIG. 3, various combinations of desired data are retrieved 222 from database 206 based upon user input 208a. This desired data is then optionally combined with any desired user defined data 208b as well as any desired agricultural products and treatments data 224 for processing by the expert system 216. As stated hereinbefore, expert system 216 is responsible for correlating desired data to create maps for prescription treatment. As previously explained, recommendation equations or application rate equations are formulas which express the relationship between existing field conditions and desired output. The expert system 216 may utilize pre-defined recommendation equations as illustrated by block 226 or user specific recommendation equations as indicated by block 208b for correlating desired data relative to desired output for the purpose of generating an application map for a particular dispensing material. These records and maps allow the computer controlled agricultural equipment 108 operator to see what actually happened during the field application and also can be used to control a computer controlled applicator or a manual applicator 108.

Recommendation equations 226 may determine dispensing rates for materials based upon soil sample data 210 and defined yield potential or productivity for a particular crop based upon field characteristics or conditions. Desired yield potential varies depending upon the soil characteristics by location. Thus, the expert system may calculate dispensing rates by location based upon the desired recommendation equation which incorporates a yield goal map based upon soil properties, or alternatively the recommendation equation may use a constant yield goal for a field. Preferably, a soil characteristic map is inputted to the system to construct a yield goal map for creating an application map based upon site specific yield goals. The soil characteristic map may be a commercially available digital soil characteristic map and predefined yield goals may be assigned to each soil characteristics area based upon a particular crop.

Figure 3A:
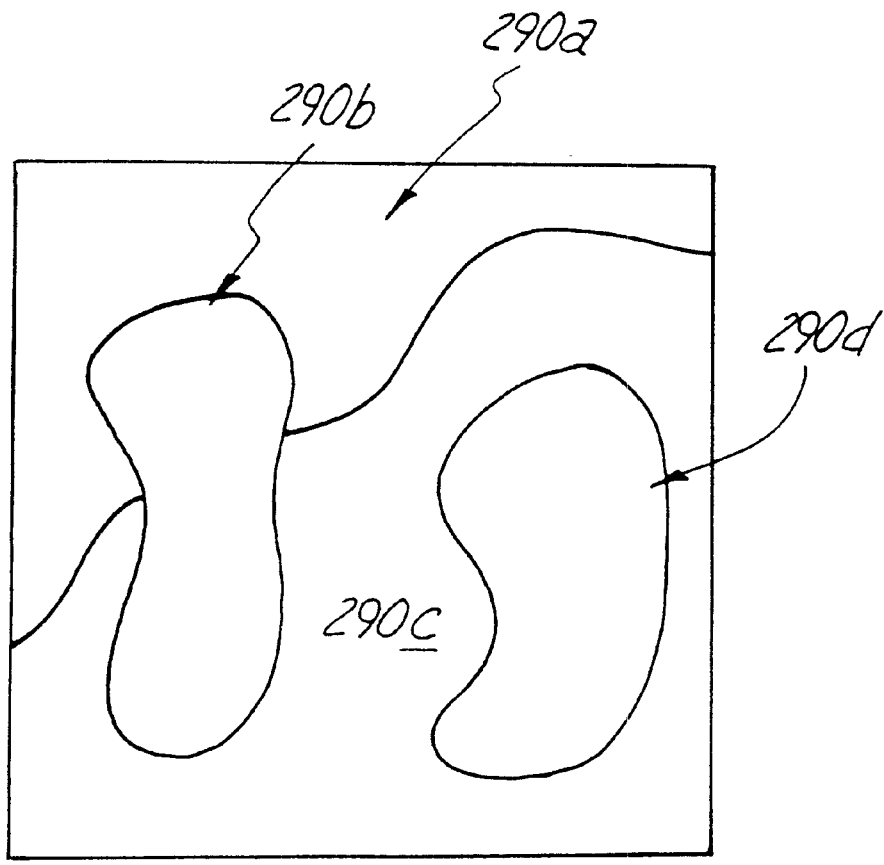
FIG. 3A is an illustration of a system for identifying field regions having varied field characteristics for analysis for creating application maps.

The GIS system of the present invention also includes a system for displaying via an output device 107 (FIG. 4) a polygon type boundary map, such as a boundary map of areas of different yield goal based upon a spatial soil characteristic map, or areas of different field characteristics based upon a spatial field characteristic map, as shown in FIG. 3A. As shown, different regions 290a–d have different field characteristics which may be incorporated by a recommendation equation for determining dispensing rates by location. Preferably, the GIS system 104 of the present invention includes a user interface system designed to allow a user to modify a predefined boundary map, such as a yield goal map based upon soil properties, or create an input map. Preferably the interface system allows the user to define or change different yield goal values or attribute values for different field characteristic areas, or draw or reconfigure boundaries for different field characteristic regions or areas. Thus, the boundaries for areas 290a–d may be drawn or changed and the areas or regions 290a–d may be assigned different yield goals via the user interface. The drawing capabilities of the system for defining regions of similar field characteristics or attributes for creating input maps for use in generating an application map may be accomplished by available drawing software such as drawing software available from MapInfo Corporation of Troy, N.Y.

Figure 4:
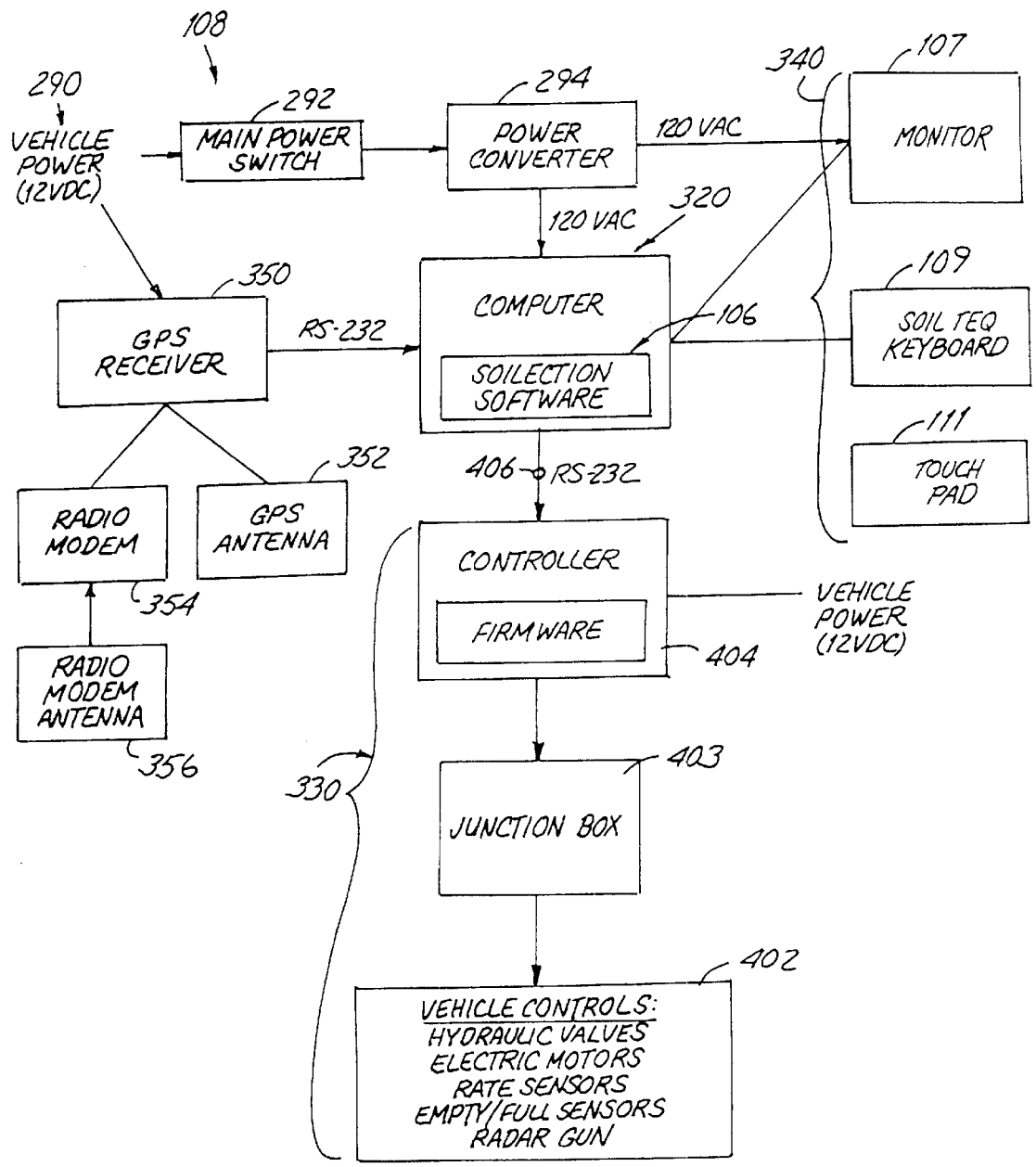
FIG. 4 is a block diagram illustrating one preferred embodiment for monitoring and controlling particular vehicle controls for an automated agricultural machine via a variable rate application map.
Figure 5:
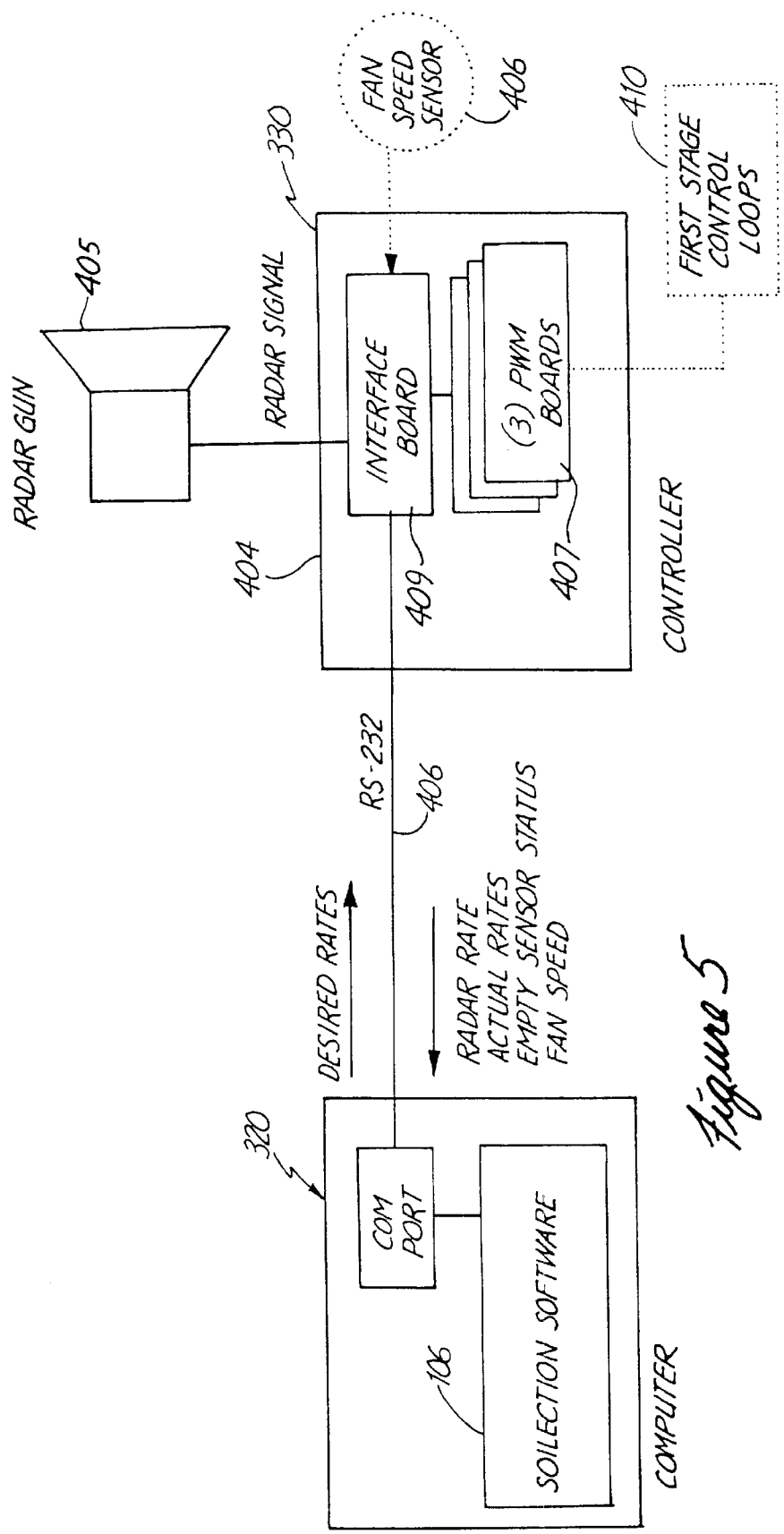
FIG. 5 is a block diagram illustrating one application of the application maps generated by the inventive geographical information system interfacing with controller hardware to calculate and control the desired product dispersion rates based on ground speed, soil characteristics and/or numerous additional vehicle configuration factors.

FIGS. 4 and 5 illustrate use of the present GIS system for controlling a dispensing apparatus of an agricultural vehicle 108. FIG. 4 is a block diagram illustrating use of the present inventive GIS system for controlling agricultural equipment 108. The GIS system 104 is typically located in an office off-site from the targeted field, so that the application maps and reports 106 are taken from the office to the computer controlled agricultural equipment 108 in, for instance, electronic or magnetic media form as described hereinbefore. Application maps and reports 106 of the GJS system interface with computer controlled agricultural equipment 108.

The computer controlled agricultural equipment 108 comprises a Global Positioning System ("GPS") 350, a central control system 320, a vehicle control system 330, a user interface system 340, as well as a source of power 290, main power switch 292, and power converter 294. The GPS 350 may comprise a GPS antenna 352, a radio modem 354, and a radio modem antenna 356. The user interface system 340 may include a monitor 107, keyboard 109, or touch pad 111.

The central control system 320 is typically an on-board computer capable of operating software, specifically the application maps 106 created by the GIS system 104. The central control system 320 is coupled to the GPS 350, the vehicle control system 330, and the user interface 340. GPS 350 uses satellites to determine a georeferenced position of the vehicle 108 in a field. The central control system 320 receives information from the GPS system 350 to coordinate the position of the vehicle 108 with the application maps 106 so that the proper amount or rate of dispensing material is spread at the proper field location.

The vehicle control system 330 for the dispensing apparatus includes a controller 404, junction box 403, and vehicle controls 402, such as hydraulic valve, electronic motors, rate sensors, empty/full sensors, and/or radar gun. The controller 404 controls the mechanical operation of the vehicle controls 402 of the dispensing apparatus. The central control system 320 communicates instructions of the application maps and reports 106 created by the GIS system 104 to the vehicle control system 330 (i.e., the controller 404 which operates the vehicle controls for effecting variable rate application.) Controller firmware 404 handshakes with the application maps and reports 106 formulated by GIS software 104 to control vehicle controls 402.

The controller 404 is coupled to vehicle controls 402 to thereby effectuate the variable rate dispensing of material based upon an application map 106 generated by the GIS system 104. The controller firmware 404 interfaces with the central control system 320 (including application maps) by an RS-232 interface 406. It will be appreciated by those skilled in the art that the present invention is not so limited however, and that other types of interfaces could also be utilized. As illustrated in FIG. 4, a user 340 may interface with control software 320 to control the vehicle control system 330 and override the application prescription of the GIS system 104. The user may interface with monitor 107 to view the proposed prescription plan generated by the GIS system 104 and modify the prescription application plan if desired.

Looking now at FIG. 5, one embodiment for a control loop is illustrated which depicts in detail hardware devices used for controlling miscellaneous portions of the computer controlled agricultural equipment 108 dispensing apparatus. FIG. 5 is a more detailed illustration of the interface of the application maps 106 of the GIS System 104, the central control system 320 and the controller 404 for the vehicle controls 402 for the dispensing apparatus of the computer controlled agricultural equipment 108. As shown in FIG. 5, the vehicle controls 402 for the dispensing apparatus may include a radar gun 405, a fan speed sensor 406 and a control loop 410 for sensing vehicle speed and fan speed. The central control system 320 (i.e. application maps 106) interfaces with radar gun 405, fan speed sensor 406 and other equipment device control loops 410 via interface boards 407, 409 of controller 404. As shown in FIG. 5, the desired rate obtained from the application map 106 for a particular location is transferred to the controller 404 for effecting variable rate control. As also shown in FIG. 5, the controller returns to the central control system 320 spread data including radar rate from radar gun 405, actual rates, and empty sensor status and fan speed from fan speed sensor 406 for use in generating a field treatment map for incorporation into the GIS system 104.

Figure 6:
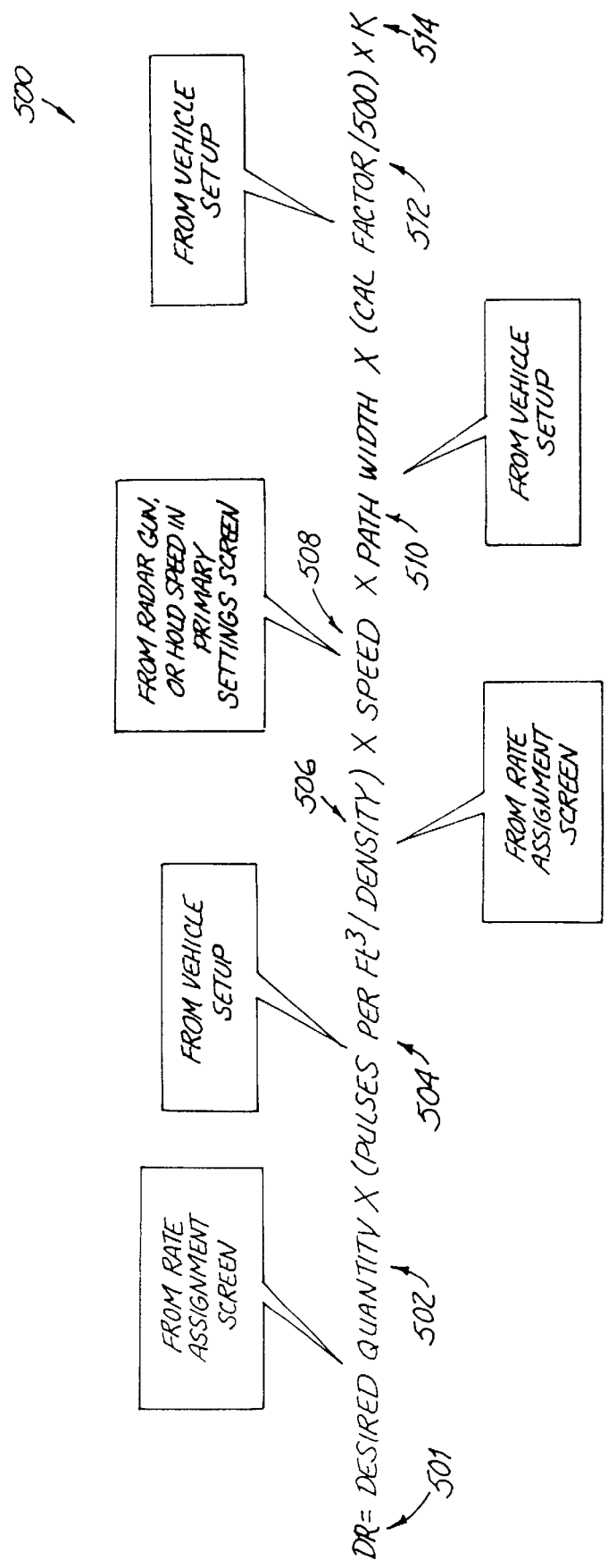
FIG. 6 is a diagram illustrating one embodiment of a controlling rate equation which is used to control the hardware depicted in FIGS. [6] 5.

One preferred embodiment depicting use of specific individual computer controlled equipment devices to determine and control the desired rates of product dispersion from an applicator via an application map is shown in FIG. 6. Rate equation 500 comprises desired rate ("DR") 501, Desired Quantity 502, Pulses per cubic foot 504, Density 506, Speed 508, Path Width 510, Calibration Factor 512, and Constant 514. DR 501 is the desired rate expressed as a frequency (Hz, or pulse/sec). Desired Quantity 502 is the amount of product to be applied in terms of pounds per acre. Pulses per cubic foot 504 is the number of pulses from a rate sensor required to dispense one cubic foot of product. Density 506 is the product density in pounds per cubic foot. Speed 508 is the vehicle speed in miles per hour. Path Width 510 is the application spread width in feet. Calibration Factor 512 is the rate calibration factor normalized to 500 (no units). The Constant 514 is a constant units conversion factor to match the units of speed, path width, and time base.

The desired quantity data 502 is obtained from an application map, data representing the number of pulses from a sensor to dispense one cubic foot of desired product 504 may be obtained from the vehicle setup parameters, product density data 506 may also be obtained from an assignment map, vehicle speed data 508 may be obtained from a radar gun 405, path width data 510 may be obtained from the vehicle setup parameters, and a calibration factor 512 may be obtained from the vehicle setup parameters unique to the specific equipment in use. The preferred embodiment illustrated in FIG. 6 multiplies the aforementioned data to realize a desired rate 501 which is then scaled by a scaling factor to match the units of speed, path, width, and time base to achieve a desired rate of product dispersion from the computer controlled agricultural equipment 108 of interest.

Likewise, the same method may be employed to reconstruct the actual quantity of product spread by location based upon spread data from the various rate sensors and other sensors, including the radar gun 405 recorded by the controller 404 and transferred to the central control system 320. Thus, spread data based upon data collected from the various rate sensors coupled to various valves, motors, or other dispensing devices is coupled with location data to construct an "as spread" map. Preferably, the controller 404 software records the actual spread rate, the geographic position, and the time. As previously explained in relation to FIG. 3, spread data may be inputted into the GIS system 104 for use of precision fanning and/or may be displayed electronically or in paper form as a report or map 106. The "as spread" map is georeferenced relative to the spread rate to correspond to the georeferenced spatial data of the GIS system 104.

In the agricultural industry, recommendations for field treatments are generally given for as set of nutrients and are uniform across the field. Commercially available materials ("commercial products") are typically blended to match the recommended treatments and then uniformly applied across the field. The process of determining the commercially available material blend is called formulation. In precision agricultural, the recommended field treatments are not necessarily uniform, so the blend of commercially available materials and its application are not necessarily uniform. Precision agriculture uses variable rate application. The present inventive GIS system 104 will take one or more field treatments or application maps for a particular dispensing material and create one or more application prescriptions or product application maps for dispensing a commercial product based upon product information 224 of the GIS system 104.

Figure 7:
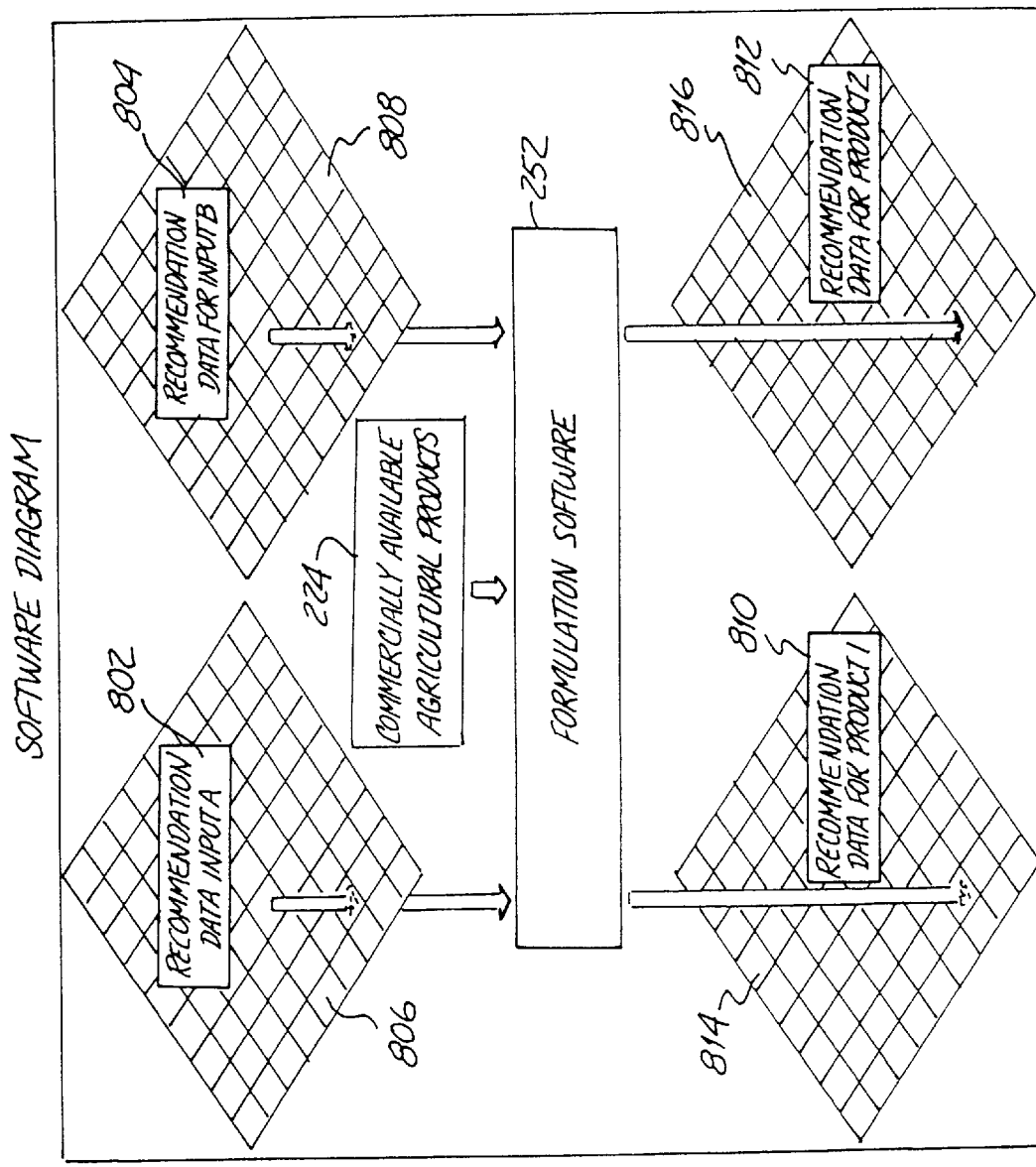
FIG. 7 is a diagram illustrating the manner in which the present inventive geographical information system functions to combine field treatment recommendation data with commercially available products and pre-blended materials to create output data necessary to formulate product application maps and/or reports.

This process of adapting treatment data for commercial products can more readily be understood and appreciated by reference to FIG. 7. The process utilized by the present invention combines recommendations for each predetermined/desired input and the chemical analysis for each commercially available product spatially and mathematically to output product application data. The output data format may be either in report or map format on paper or digital media, for example. The present inventions is not so limited, however, and it will be appreciated by those skilled in the art that other types of media also be utilized.

Looking now at FIG. 7, a diagram of the routine is illustrated. The recommendation data or application map 806 and 808 for treatment materials 802 or 804 represents the recommended amount of a field treatment determined by the system for a particular treatment material 802 or 804. This application data of the application maps 806 and 808 for the treatment materials 802 and 804 may vary across the field to reflect changes in soil properties and conditions that will affect crop growth. There are two input data sets or application maps 806 and 808 for treatment materials 802 or 804 depicted in FIG. 7, however, it shall be understood that there may be one or more input sets used in the present invention.

The commercially available products 224 include both commercially available products and pre-blended materials. Examples of these products would include, but not be limited to, diamonium phosphate (DAP), potash or urea. Each of these products contain a percentage of one or more field nutrients or treatment materials. The formulation software 252 contains routines necessary to read the recommended input data 806 and 808 for treatment materials 802, 804 and the commercially available agricultural product list 224. It also contains the mathematical and spatial routines to combine the input data 806 and 808 for treatment materials 802, 804 and product list 224 based on a set of instructions or rules given by an expert system 216 or user input 208.

This software 252 also has the routines to create product application maps 814 and 816 for controlling a dispensing apparatus of computer controlled agricultural equipment 108 in map or report form on paper or electronic media 106 as stated hereinbefore. As an example, the formulation software 252 may determine application rates for commercial product 810 and commercial product 812 based upon application maps 806 and 808 for treatment materials 802 and 804, respectively. In particular, the recommendation application data 814 and 816 for commercial product 810 and commercial product 812 represents the recommended amount and blend of products that are required for a given field treatment based on the instructions contained in the formulation software 252. The formulation software 252 formulates for each dispensing position commercial product dispensing rates based upon desired dispensing rates of the component nutrients as well as based upon cost and suitability for the crop and applicator. There are two product recommendation application maps 814 and 816 depicted in FIG. 7; however, it shall be understood that the present invention may include one or more such product application maps.

Figure 8:
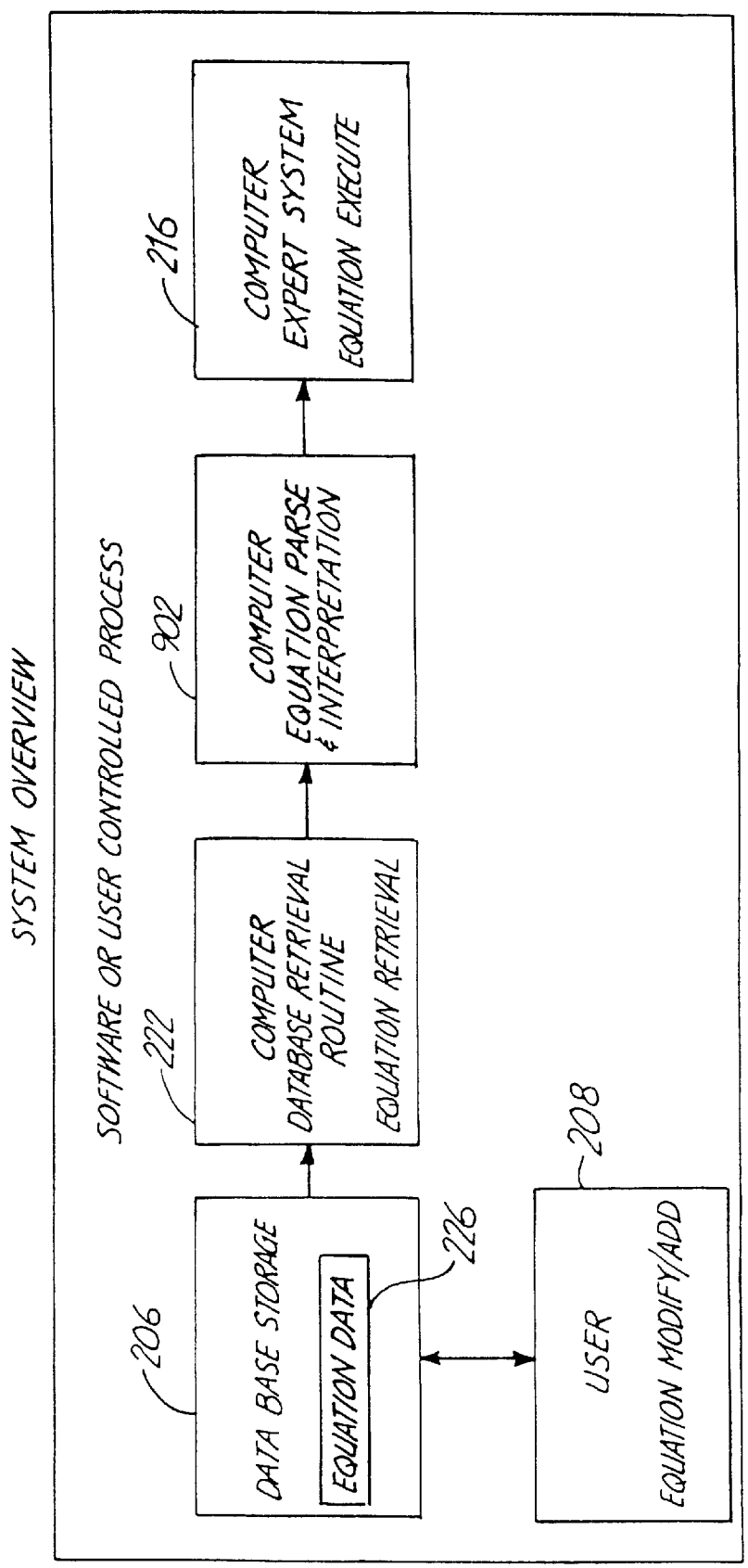
FIG. 8 is a block diagram illustrating the manner in which the present inventive geographical information system functions to allow system users access to agronomic recommendation equations or application rate equations in a database to add and modify equations and data relationships for agricultural data.

FIG. 8 illustrates storage and execution of recommendation equations 226. Recommendation equations 226 are stored in a database 206 and retrieved as illustrated by block 222 for execution. Recommendation equations 226 may be predefined equations or may be user inputted or defined as illustrated by block 208. The recommendation equations 226 are not stored compiled and accordingly, are compiled (i.e. parsed) as illustrated by block 902 for execution at block 216. Equations 226 are parsed at the time of creating precision farming application maps with the parsing module 1102 depicted in FIG. 10, derived from compiler theory of computer science known to those skilled in the art.

Figure 9:
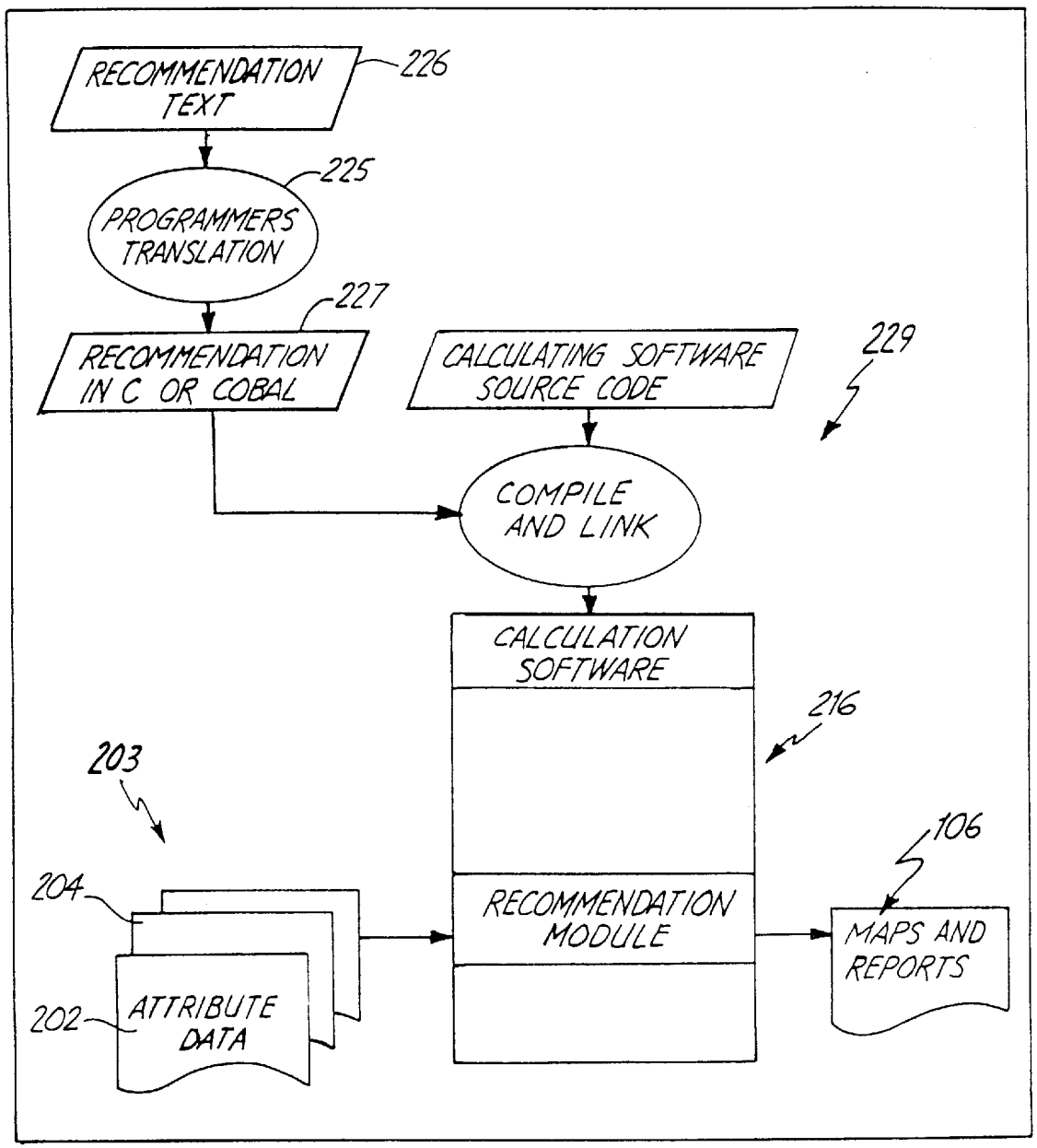
FIG. 9 is a diagram illustrating one manner in which geographical information system may store agronomic recommendation equations or application rate equations.

Generally, computer calculated agronomic recommendation equations may be coded into a software system before the software is compiled in a manner well known to those skilled in the art. Equations 226 are translated 225 into a programming language such as C or COBOL 227, for example, and linked to be part of the delivered software system 229. FIG. 9 illustrates this well known software system 1000. As shown in FIG. 9, recommendation equations 226 are pre-compiled prior to execution to create application maps 106 from input data 203 (i.e. attribute and geographic data 202 and 204). However, agronomic recommendations are irregular, complex and dynamic. Users often need to alter an existing equation(s) or even create their own, e.g. to match the characteristics of the particular machine or equipment of interest, as stated hereinbefore. Current methods, known to those skilled in the art, do not meet these needs. Since the recommendation equations 226 are pre-compiled users cannot alter the equations without recompiling the equations for execution. Thus, this restricts the flexibility of the system.

Figure 10:
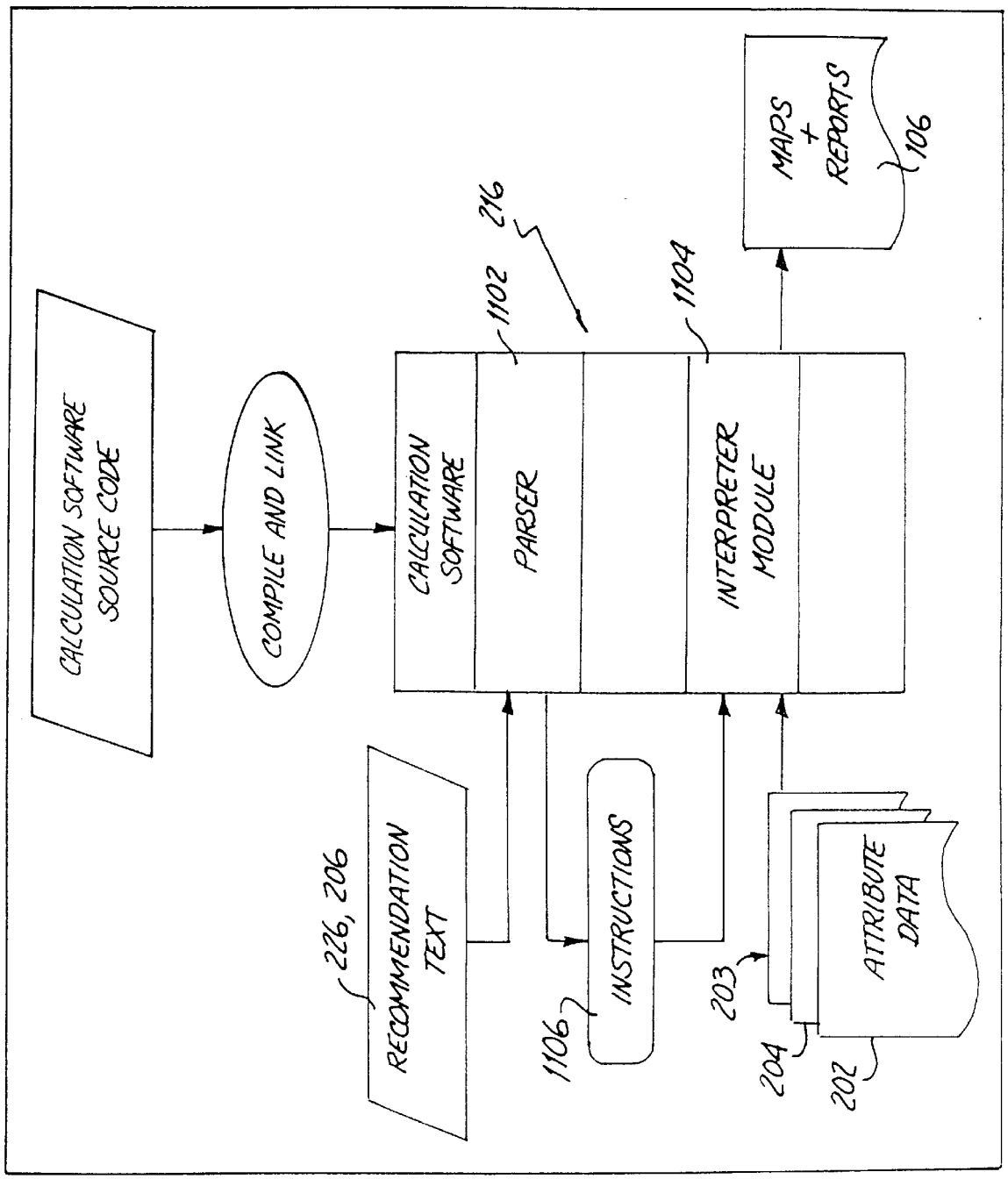
FIG. 10 is a diagram illustrating the manner in which the present inventive geographical information system stores recommendation equations or application rate equations as data in a database.

The present invention overcomes the shortcomings of prior art systems by providing a system and method of use which stores recommendation equations 226 as data in a database 206. One preferred embodiment illustrating the present inventive method allowing a user access to alter an existing recommendation equation(s) 226 or to create their own is illustrated by block 208 of FIG. 8. The stored recommendation equation data 226 is actually the knowledge of agronomists, which will hereinafter be referred to as knowledge-base. FIG. 10 illustrates the preferred system of the present invention. In the embodiment shown in FIG. 10, expert system 216 embodied within the system includes a parser module 1102 to understand the grammar of the equations 226, an interpreter module 1104 to drive the map making system, and a knowledge-base 206 to store user equations 226. The parser module 1102 splits the equation 226 text into a list of instructions 1106 similar to assembly language code known to those skilled in the art. This instruction set 1106 commands the operation of the interpreter module 1104 to generate the final output data or application maps 106 from input data 203 (such as attribute and geographic data 202 and 204). Typical functions of the instructions set 1106 include, but are not so limited to, getting data values from input data 203, performing mathematical operations on data value(s), storing results, and controlling flow commands for the present inventive processes illustrated in FIGS. 2 and 3.

The construction of the expert system 216 utilized by the present inventive GIS system 104 has some key components, which will now be described in detail. Preferably, a recommendation equation 226 is expressed in LL (1) grammar or its subset. In this way, the correctness is insured by the theory of compilers known to those skilled in the art of computer science. For example, a recommendation equation 226 could be expressed as:

$$P[0, 17] + :$$

1. $300 + (28.4 - p) * 4 + (yield - 150) * .5 + (21.4 - p) * 4 - 10 +$ $$(17.5 - p) * 20; [17, \max] + :$$

2. $300 + (28.4 - p) * 4 + (yield - 150) * .5 + (21.4 - p) * 4 - 10$

This means that if the soil phosphorus test level is greater than 0 and less than 17, the output location specific instruction (i.e., for application map) 106 is based on the first equation, but not less than 0; and if the test level is equal to or greater than 17, the output 106 is based on the second equation but not less than 0.

The LL(1) grammar representative of the above recommendation equations could be expressed as:

| | |
|---|---|
| recomm | : baseOn equation funList |
| baseON | : NUTRIENT |
| | – \| |
| | ; |
| equation | : equation ';' clause |
| | \| clause |
| | ; |
| clause | ; range raise ';' expr |
| | ; |
| range | : ['low ',' high'] |
| | \| |
| | ; |
| low | : NUMBER |
| | ; |
| high | : MAX VALUE |
| | \| NUMBER |
| | ; |
| raise | : '+' |
| | \| |
| | ; |

-continued

| | |
|---|---|
| expr | : expr '+' term<br>\| expr '−' term<br>\| term<br>; |
| term | : term '*' factor<br>\| term '/' factor<br>\| factor<br>; |
| factor | : '(' expr ')'<br>\| NUMBER<br>\| NUTRIENT<br>; |
| nurtlist | : nurtrlist ',' NUTRIENT<br>\| NUTRIENT<br>; |

The interpreter module 104 is capable of using multiple input data sets 202 and 204. Preferably, actual user input data 202 and 204 is derived directly from the equation input variable set 226. Typical user input data 202 and 204 may include, by way of example, but is not so limited to, input maps such as yield goal maps based on soil properties or previous yield history, soil test nutrient level maps, and other soil and crop properties. The interpreter module 1104 repeatedly executes the instruction set throughout every data point in the input data set 202 and 204 to create application maps 106. It will be appreciated by those skilled in the art that the present invention is not so limited however, and that the recommendations may just as well be expressed with grammar other than LL(1) grammar or its subset, such that correctness is insured by the theory of compilers known to those skilled in such art.

Figure 11:
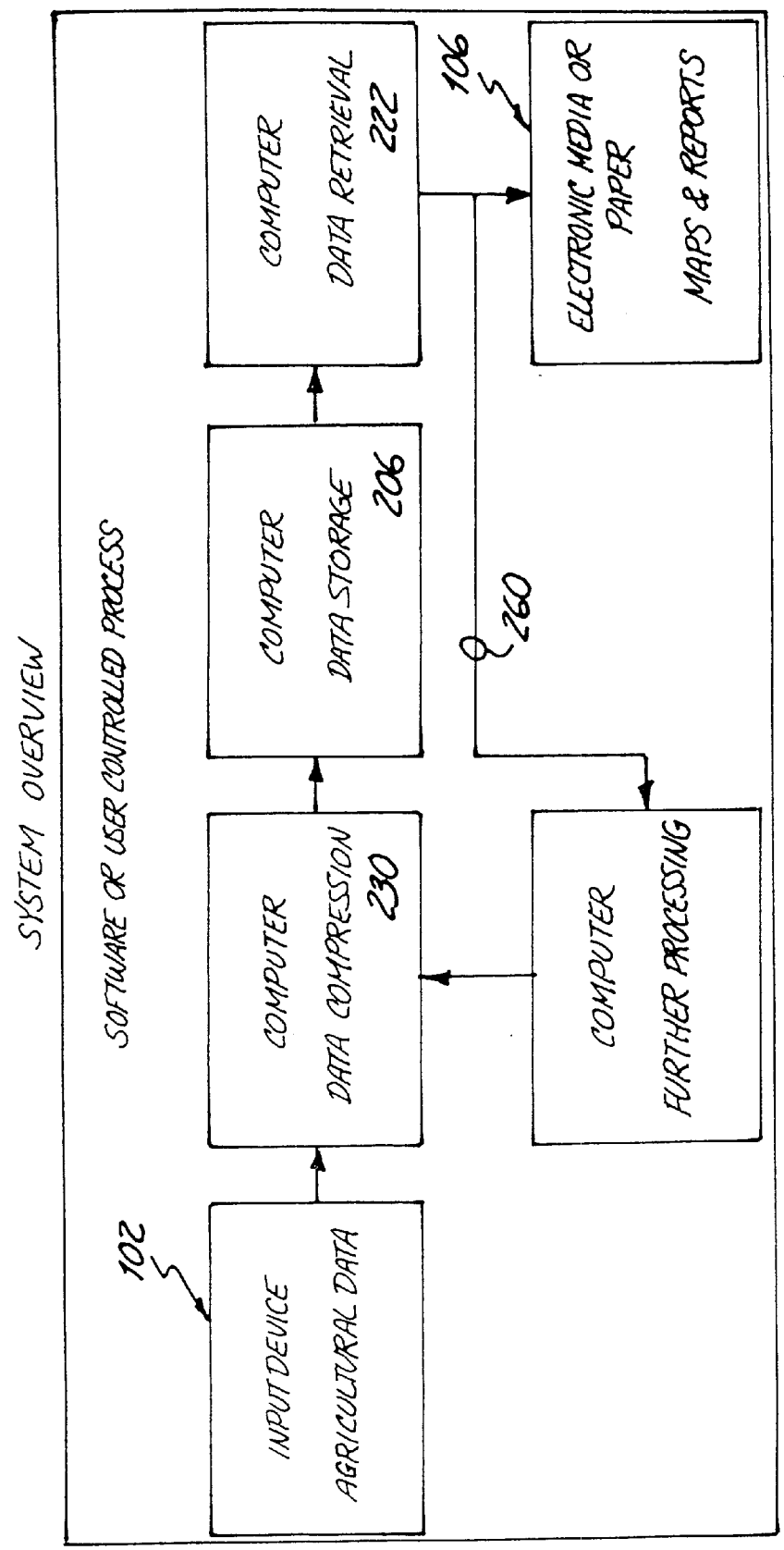
FIG. 11 is a simplified block diagram illustrating the present inventive system equipped with spatial database software as an information center capable of storing all the spatial information required to manage a field.

FIG. 11 illustrates the data storage process illustrated generally in FIG. 3. As shown, agricultural data such as attribute data 202 and geographic data 204 is inputted at 102 and compressed 230 for data storage 206. The data may be retrieved at 222 for analysis or for manipulation by the expert system 216 as shown in FIG. 10 to produce output data 106 preferably in the form of application maps and reports. As shown in FIG. 11, these output maps 106 may be stored at 206 as illustrated by line 260 for further processing and use.

Figure 12:
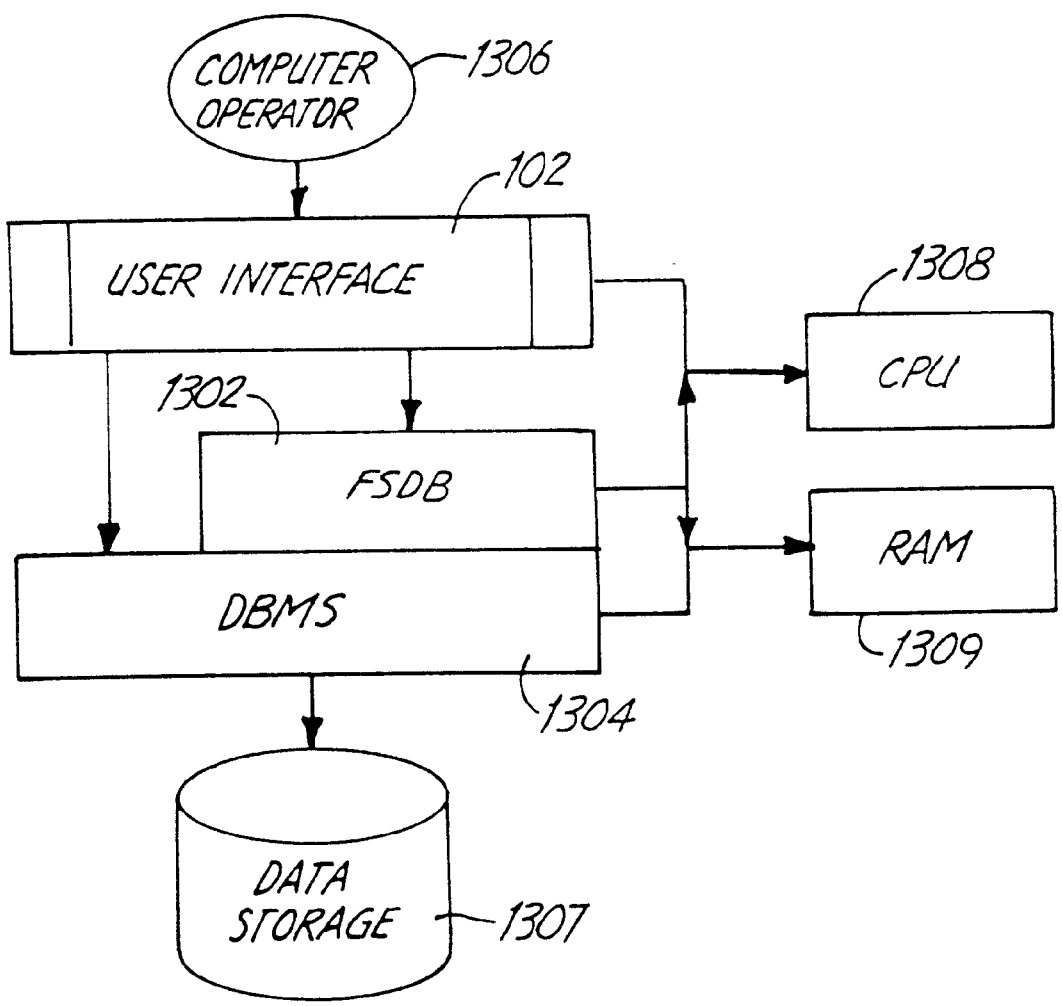
FIG. 12 is a simplified block diagram illustrating the relationship between the user interface, the field spatial database, a conventional database management system and a record manager or custom software for one embodiment of the present invention.

FIG. 12 illustrates a preferred embodiment of data storage for the GIS system of the present invention. Shown in FIG. 12 is the computer operator 1306, user interface 102, FSDB 1302, DBMS 1304, data storage 1307, CPU 1308, and RAM 1309. Geographic or spatial based data is preferably stored in a field spatial database 1302. A database management system 1304 interfaces with the field spatial database 1302 for data management based upon data attributes. FIG. 12 illustrates one preferred relationship between a user interface 102, a field spatial database (FSBD) 1302, and a conventional database management system (DBMS) 1304 such as a relational database, ISAM record manager or custom software for the present invention. User interface 102 allows communication between the computer system 104 and the user 1306. The FSBD 1302 is responsible for performing the spatial data management and all the spatial queries, e.g. depicted in FIG. 7. The DBMS 1304 is responsible for creating the database tables and the data attribute searches.

Figure 13:
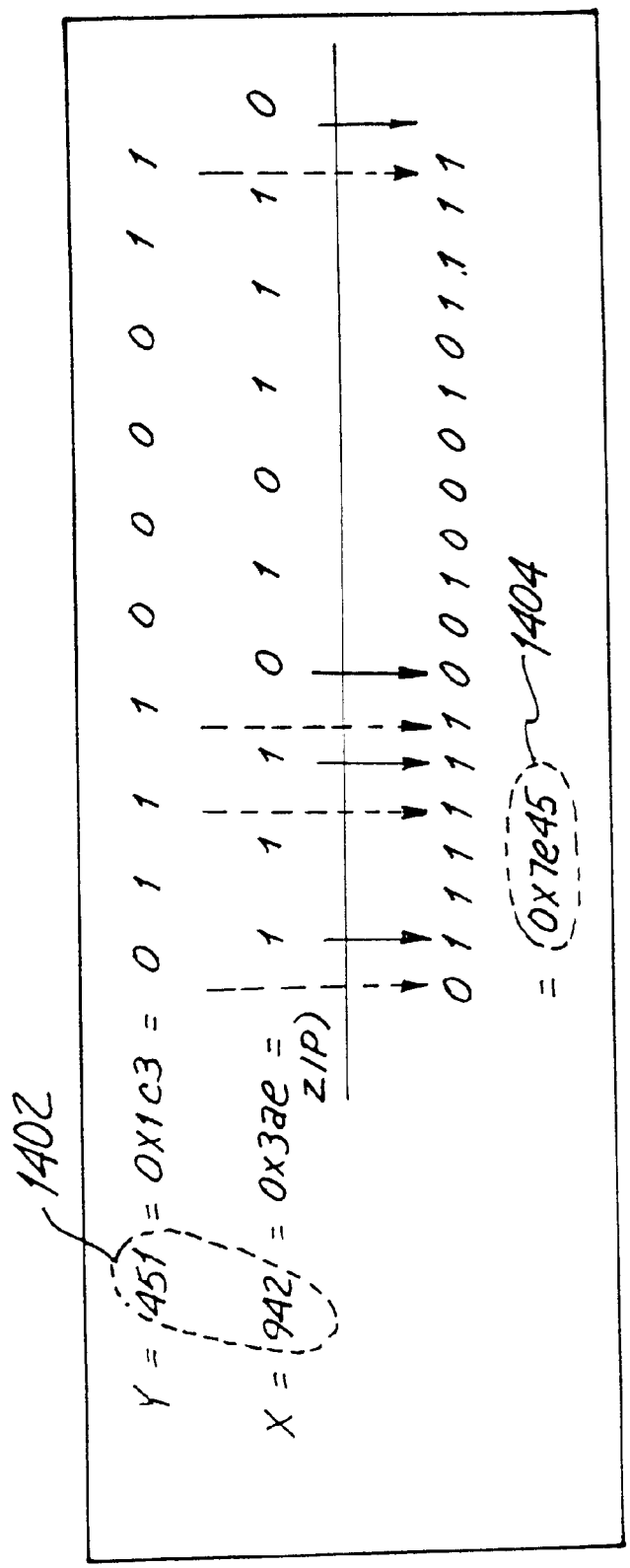
FIG. 13 diagrammatically illustrates one embodiment for performing field spatial data conversion for the present invention.

FIG. 13 illustrates one preferred method for reducing the time required for the GIS system computer 104 to access data as well as reducing the storage requirements for the data. Specifically, the FSBD 1302 has utilities to translate between an external standard format and an internal quad format for storing data. FSBD 1302 converts locations of geographical or spatial field data, such as sample points, field boundaries, and soil survey maps, from floating point type numbers into internal integer type numbers, preferably a linear quadtree, or quad format such as that presented in detail immediately hereinbelow.

Given a georeferenced point location in the form of a spherical coordinate system, expressed as a pair of floating point type numbers, e.g. (longitude and latitude) the first step in the method requires converting the floating point pair into an integer pair, e.g (x, y). Subsequently, the integer pair is converted into a single integer having doubled length via a bit-wise zip routine, for example. This results in a quad. Those skilled in the art will readily recognize and appreciate that the preferred conversion routine is a variation of the Morton running codes routine. This process can better be described and understood with reference to FIGS. [14] 13 by way of example as follows:

Given the point (45.1, 94.2) is a point on the earth, the integer pair can be represented simply as (451, 942) 1402. Following the conversion to integer pair 1402 format, the quad of the point is calculated as shown in FIG. 13, resulting in quad (0×7e45) 1404. Those skilled in the art will readily recognize and appreciate that the original floating point values can be calculated and reclaimed, if so desired, by performing the inverse of the aforementioned steps, e.g. a quad is un-zipped into two integers, one for latitude and one for longitude. These integers are then de-normalized into floating point type actual values of latitude and longitude.

Figure 14:
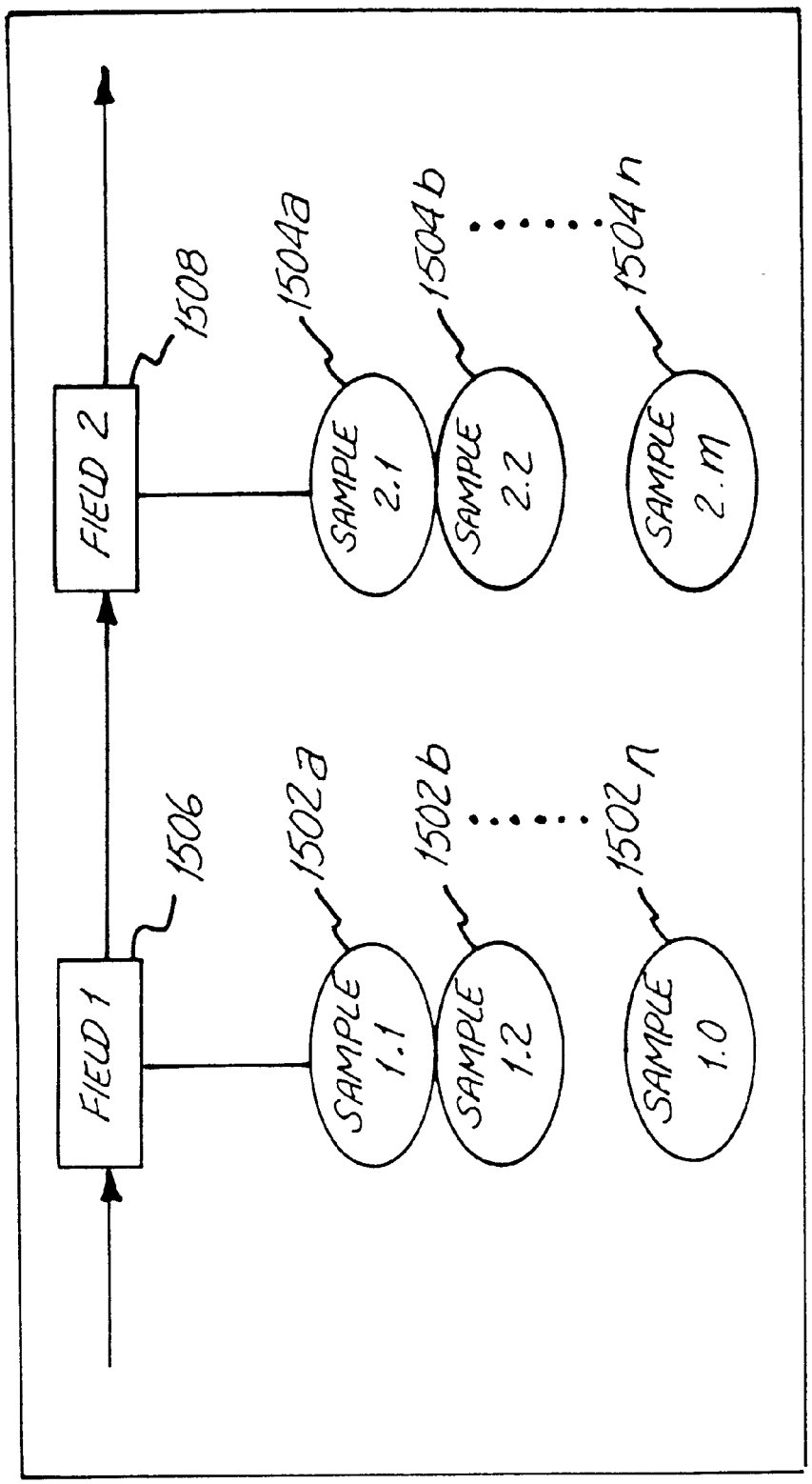
FIG. 14 illustrates a field spatial database in which samples are stored relative to a particular field.
Figure 15:
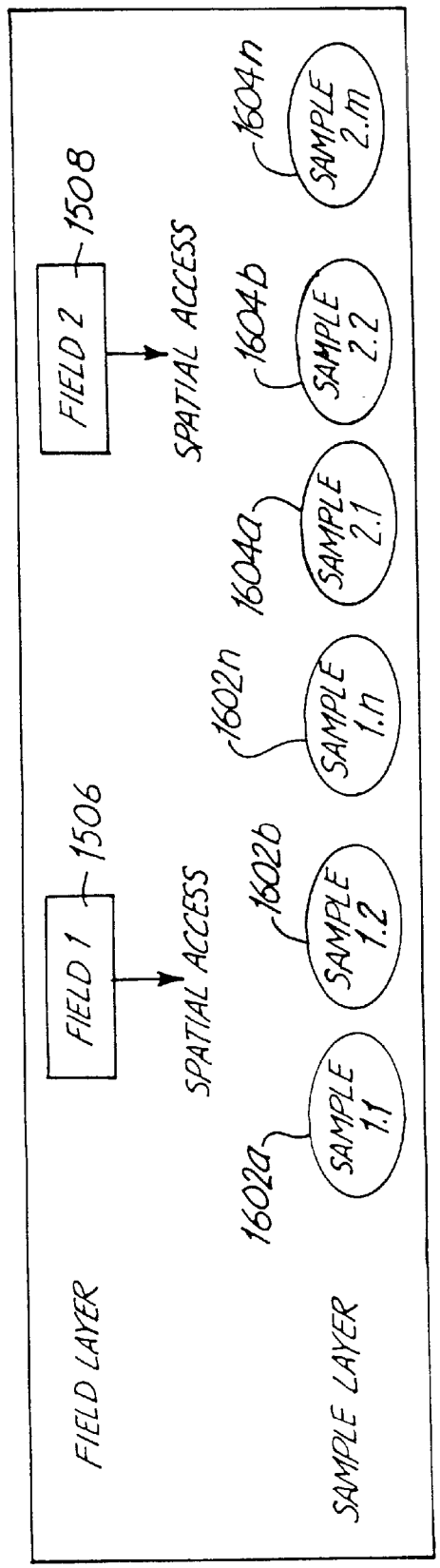
FIG. 15 illustrates one embodiment of a field spatial database for retrieving spatial field data for the present invention.

FIG. 14 illustrates one embodiment for a method of using a field spatial database for retrieving soil samples for the present invention. As illustrated in FIG. 14 field data 1502*a–n* and 1504*a–n* represents geographical type mapped data 204 (i.e., spatial data) for a particular field based upon a field location. Each field attribute 1502*a–n*, 1504*a–n* is typically stored as shown relative to a particular field 1506, 1508 to which the data relates. In contrast with these known systems, FIG. 15 illustrates the field spatial database utilized by the present invention. As shown in FIG. 15, spatial field data 1602*a–n* and 1604*a–n* is not explicitly associated with a field 1506 and 1508. Instead, fields 1506 and 1508 and data 1602*a–n* and 1604*a–n* are stored in separate layers. The FSDB uses the field boundary data 212 to determine which samples are contained inside the field of interest based upon the quad format location information for the geographic data 1602*a–n* and 1604*a–n*.

The FSDB structure utilized by the present invention as illustrated in FIG. 15, has several advantages over the structures utilized by other precision agriculture database systems known in the art. These advantages support the other capabilities of the present invention to formulate reports and maps which can be used as inputs to control computer controlled agricultural equipment 108 and include, but are not necessarily limited to: 1) Soil sample records or spatial field data 1602*a–n*, 1604*a–n* need not be renamed or regrouped when a field 1506 and 1508 is merged or subdivided; 2) Soil sample or spatial field data 1602*a–n*, 1604*a–n* will continuously be valid even after a field 1506 and 1508 is removed; and 3) it is easy and flexible to analyze and to create reports on any combination of soil samples or spatial field data 1602*a–n*, 1604*a–n*.

One feature of the FSDB retrieves soil sample data or other geographic field data, as stated hereinbefore. The FSDB uses spatial queries keyed by the geometry of the field to get all samples or data inside a field of interest (i.e., 1506 and 1508). In one preferred embodiment 1600, this is accomplished by first retrieving the field perimeter from the DBMS 1304, either by name or other identifier. The DBMS 1304 passes the field perimeter name or identifier (i.e., 1506 or 1508) to the FSDB 1302 as a spatial key, or cookie-cutter, to acquire all the point records 1602a–n or 1604a–n that fall within the field of interest 1506 or 1508. Finally, some sample or data points may be excluded from the return list based on the qualifiers specified by user(s), such as between the time and date the samples were taken.

Figure 16:
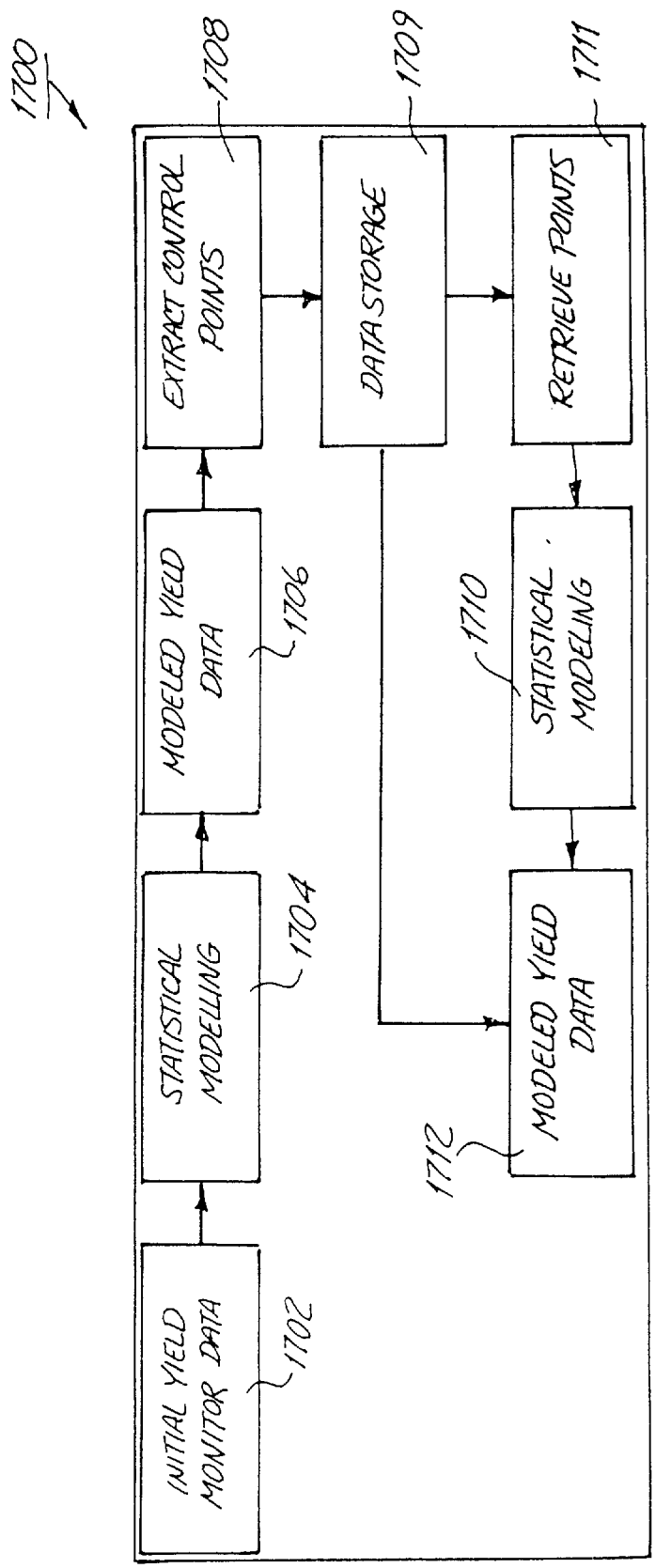
FIG. 16 illustrates one embodiment for a method of storing yield monitor data in a field spatial database for the present invention.

FIG. 16 illustrates one preferred embodiment showing one method for storing yield monitor data 1702 in a field spatial database for the present invention. Yield monitor data 1702 relates to crop production data based upon field location as recorded by a yield monitor device after harvest. Yield data is helpful to assess future treatment plans. It is generally known in the art of precision agriculture, that yield monitor data 1702 can be voluminous and noisy. Storing such data directly into a database can be costly in terms of storage space and access time. The present invention utilizes the data storage method illustrated in FIG. 17 to improve the performance of yield monitor data 1702. The method includes processing the yield monitor data 1702 by smoothing it to remove noise and mathematically modeling 1704 the data into area coverage yield data 1706. Other routines known to those skilled in the art of programming and mathematically modeling can further break the modeled data 1706 into control points 1708. The control points 1708 can be stored in data storage 1709 such that the original yield data area coverage 1712 can be reproduced by retrieving 1711 the control points 1708 from storage 1709 and statistically modeling 1710 the control points 1708. According to one preferred embodiment for the present invention, either the yield data area coverage or the control points may be stored by the field spatial database (FSBD).

This invention has been described herein in considerable detail in order to comply with the Patent Statutes and to provide those skilled in the art with the information needed to apply the novel principles and to construct and use such specialized components as are required. However, while particular embodiments of the present invention have been described herein in detail, it is to be understood that various alterations, modifications and substitutions can be made therein without departing from the spirit and scope of the present invention, as defined in the claims which follow. For example, it will be appreciated that although the present invention will provide an optimum recommendation for a particular field, such a recommendation may be more costly than desired by an equipment user or group of users. In such instances, it would be desirable to reduce the recommendation cost by a desired percentage. The present invention will allow an economic balancing process to be performed on zones for a given field. The balancing process will show which pixels generate a higher return rate so that those zones having a poor return rate can be ignored or treated differently than those zones having the higher rate of return. In this way, it will be possible to utilize the optimum recommendation at a more desirable cost because the user(s) can reduce or alter the recommendations for pixels having poor return rates without harming the remaining field areas. This process will allow the equipment user(s) to regain what would have resulted in a higher cost to the user(s) from utilizing the optimum recommendations.

It will also be appreciated by those skilled the art that the present invention may find further useful application to spreading and application of products and chemicals in other industrial settings, e.g. on golf courses and roadways, as well as for various forestation purposes, for example.

It will further be appreciated by those skilled in the art that the present invention will be useful in spreading and application of all types of agricultural products, whether in liquid gaseous or solid form, and may include, but is not so limited to fertilizers, insecticides, herbicides and seeds, for example.

Although the present invention has been described with reference to preferred embodiments, workers skilled in the art will recognize that changes may be made in form and detail without departing from the spirit and scope of the invention.

What is claimed is:

1. A system for allowing a user to create application maps for variable rate application of material to an agricultural field based on selected field data, the system comprising:
   a data storage system for storing field data of the field, the field data including economic data;
   a user interface allowing a user to select a desired output for an area of the field; and
   a processor operably coupled to the data storage system and the user interface, wherein the processor is configured to create an application map of the area of the field based on field data and the desired output.

2. The system of claim 1 wherein the application map comprises a representation of the area of the field and variable dispensing rates of a crop product by location necessary to achieve the desired output.

3. The system of claim 2 wherein the processor utilizes recommendation equations to calculate the necessary dispensing rates of the crop product by correlating selected field data and the desired output.

4. The system of claim 3 wherein field data comprises geographic data and attribute data.

5. The system of claim 4 wherein geographic data comprises soil characteristic data and the data storage system stores the soil characteristic data relative to geographic location.

6. The system of claim 5 wherein the recommendation equations define a relationship between soil characteristic data and field yield potential.

7. The system of claim 3 wherein the recommendation equations are stored in the data storage system and the user interface allows the user to select a desired recommendation equation.

8. The system of claim 3 wherein the user interface allows the user to define the recommendation equation.

9. The system of claim 1 wherein the desired output is a crop yield.

10. The system of claim 1 wherein the economic data includes crop input cost and crop selling price.

11. A system for creating a variable rate crop product application map for use in an automated agricultural machine, the system comprising:
    a data storage system for storing field data and recommendation equations, wherein recommendation equations define a correlation between field data and crop yield, and wherein the field data including economic data;
    a user interface for allowing a user to define a field and set a desired crop yield goal for the field; and
    a processor operably coupled to the data storage system and the user interface which uses field data and recommendation equations to calculate dispensing rates of crop product and to create a variable rate application map for the user defined field.

12. The system of claim 11 wherein field data comprises soil sample data stored by geographic location indicating the soil types of the field.

13. The system of claim 12 wherein the recommendation equation determines dispensing rates for crop products based on soil type and a defined yield potential for that soil type.

14. The system of claim 12 wherein the recommendation equation defines productivity for a particular crop based on the soil type.

15. The system of claim 12 wherein the user interface allows a user to assign different yield goals to different areas of the field having different soil types.

16. The system of claim 11 wherein the user interface allows a user to input agricultural products and treatments data and the processor creates the variable rate application map using the agricultural products and treatments data.

17. The system of claim 11 wherein the user defines the field by defining a field boundary.

18. The system of claim 11 wherein the economic data includes crop input cost and crop selling price.

* * * * *